US012580608B2

(12) United States Patent
Zhou et al.

(10) Patent No.: US 12,580,608 B2
(45) Date of Patent: Mar. 17, 2026

(54) MAGNETIC INDUCTION COMMUNICATION-BASED VEHICLE CONTROL APPARATUS AND METHOD

(71) Applicant: Huawei Technologies Co., Ltd., Shenzhen (CN)

(72) Inventors: Yue Zhou, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 733 days.

(21) Appl. No.: 17/556,639

(22) Filed: Dec. 20, 2021

(65) Prior Publication Data

US 2022/0116079 A1    Apr. 14, 2022

Related U.S. Application Data

(63) Continuation of application No. PCT/CN2020/097270, filed on Jun. 20, 2020.

(30) Foreign Application Priority Data

Jun. 21, 2019    (CN) .......................... 201910541482.4

(51) Int. Cl.
    *H04B 5/24*        (2024.01)
    *B60W 10/04*        (2006.01)
    (Continued)

(52) U.S. Cl.
    CPC .............. *H04B 5/24* (2024.01); *B60W 10/04* (2013.01); *B60W 10/20* (2013.01); *B60W 30/12* (2013.01);
    (Continued)

(58) Field of Classification Search
    CPC ... H04B 5/02; H04B 5/26; H04B 5/72; H04B 5/73; H04B 5/48; B60W 10/04;
    (Continued)

(56) References Cited

U.S. PATENT DOCUMENTS

| | | | | |
|---|---|---|---|---|
| 4,657,087 A | * | 4/1987 | Livneh | A01B 69/008 180/401 |
| 4,955,447 A | * | 9/1990 | Hashimoto | G05D 1/028 318/587 |

(Continued)

FOREIGN PATENT DOCUMENTS

| | | |
|---|---|---|
| CN | 202022205 U | 11/2011 |
| CN | 102402226 A | 4/2012 |

(Continued)

OTHER PUBLICATIONS

Dunlop et al. A Phase Sensitive Guidance System for an Inductively Powered Automatic. Uided Vehicle. (Year: 1997).*

(Continued)

*Primary Examiner* — Redhwan K Mawari
(74) *Attorney, Agent, or Firm* — Leydig, Voit & Mayer, Ltd.

(57) ABSTRACT

A magnetic induction communication-based vehicle control apparatus and method are disclosed. The apparatus includes a first coil, a processor, and a communications interface. The first coil receives a signal of second coils laid along a lane. There is a preset relative location relationship between the first coil and the second coils. When a vehicle equipped with the vehicle control apparatus deviates from a predetermined travel direction, the first coil generates an electromotive force signal based on a change in the relative location relationship between the first coil and the second coils. The processor outputs a second signal based on the electromotive force signal, where the second signal is used to indicate the (Continued)

vehicle to adjust a running track to travel along the predetermined travel direction.

10 Claims, 11 Drawing Sheets

(51) Int. Cl.
| | |
|---|---|
| *B60W 10/20* | (2006.01) |
| *B60W 30/12* | (2020.01) |
| *H04B 5/26* | (2024.01) |

(52) U.S. Cl.
CPC ............. *H04B 5/263* (2024.01); *H04B 5/266* (2024.01); *B60W 2556/45* (2020.02); *B60W 2710/20* (2013.01)

(58) Field of Classification Search
CPC .. B60W 10/20; B60W 30/12; B60W 2556/45; B60W 2710/20; B60W 10/00; B60W 2710/06; B60W 30/10; G05D 1/0265; H04W 4/80; H04W 4/44; B60R 16/0231
USPC .......................................................... 701/24
See application file for complete search history.

(56) References Cited

U.S. PATENT DOCUMENTS

| | | | | |
|---|---|---|---|---|
| 5,708,427 | A | 1/1998 | Bush | |
| 7,158,051 | B2 * | 1/2007 | Strumolo | B60R 21/013 |
| | | | | 340/436 |
| 9,278,691 | B1 * | 3/2016 | Zsombory | G08G 1/09623 |
| 2004/0246112 | A1 * | 12/2004 | Strumolo | B60Q 9/008 |
| | | | | 340/435 |
| 2009/0179608 | A1 * | 7/2009 | Welchko | H02M 7/53875 |
| | | | | 318/811 |
| 2009/0319212 | A1 * | 12/2009 | Cech | B60R 21/0136 |
| | | | | 702/65 |
| 2012/0033076 | A1 * | 2/2012 | Nakamura | B60W 10/06 |
| | | | | 348/148 |
| 2013/0332007 | A1 * | 12/2013 | Louboutin | H04M 1/724098 |
| | | | | 701/1 |
| 2015/0302745 | A1 * | 10/2015 | Boys | H04B 5/79 |
| | | | | 340/935 |

| | | | | |
|---|---|---|---|---|
| 2016/0064994 | A1 * | 3/2016 | Ku | H02J 50/10 |
| | | | | 307/104 |
| 2016/0082957 | A1 * | 3/2016 | Zsombory | G08G 1/167 |
| | | | | 701/1 |
| 2016/0339785 | A1 * | 11/2016 | Rumbak | B60L 5/005 |
| 2017/0057780 | A1 * | 3/2017 | Nguyen | H04B 5/72 |
| 2017/0341519 | A1 * | 11/2017 | Ely | B60L 53/12 |
| 2017/0361725 | A1 * | 12/2017 | Seong | G01D 5/20 |
| 2018/0056800 | A1 * | 3/2018 | Meichle | B60L 53/305 |
| 2018/0350234 | A1 * | 12/2018 | Myers | G08G 1/017 |
| 2019/0225265 | A1 * | 7/2019 | Takama | B62D 6/001 |
| 2020/0175851 | A1 * | 6/2020 | Serban | H04W 4/38 |

FOREIGN PATENT DOCUMENTS

| | | | | | |
|---|---|---|---|---|---|
| CN | 202929482 | U | 5/2013 | | |
| CN | 205139706 | U | 4/2016 | | |
| CN | 109643486 | A | 4/2019 | | |
| JP | S4984398 | A | 8/1974 | | |
| JP | H06214641 | A | 8/1994 | | |
| JP | 2001273597 | A | 10/2001 | | |
| JP | 2014162304 | A * | 9/2014 | ......... B60R 16/0231 |
| JP | 2014236539 | A * | 12/2014 | | |
| JP | 2018032901 | A | 3/2018 | | |
| JP | 2018206106 | A | 12/2018 | | |
| KR | 101340503 | B1 | 12/2013 | | |
| WO | 2017187881 | A1 | 11/2017 | | |
| WO | 2018043273 | A1 | 3/2018 | | |
| WO | 2018181053 | A1 | 10/2018 | | |

OTHER PUBLICATIONS

Dunlop et al. A Phase Sensitive Guidance System for an Inductively Powered Automatic. Uided Vehicle. (Year: 1997) (Year: 1997).*

Dunlop et al., "A Phase Sensitive Guidance System for an Inductively Powered Automatic Guided Vehicle," ICAR'97, Monterey, CA, total 6 pages (Jul. 7-9, 1997).

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 6: Wireless Access in Vehicular Environments, IEEE Computer Society, IEEE Std 802.11p-2010, Total 51 pages, Institute of Electrical and Electronics Engineers, New York, New York (Jul. 2010).

* cited by examiner

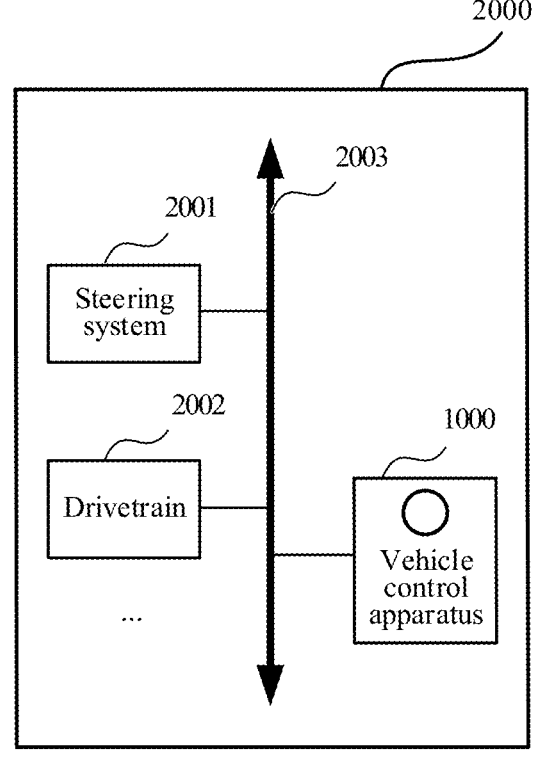
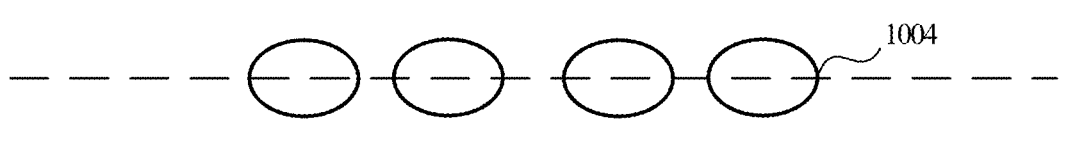
FIG. 4

S101

Second coils 1004 laid along a predetermined travel direction transmit a first signal, where the second coils are laid parallel to the ground and arranged in a row along the predetermined travel direction

S102

A vehicle equipped with a vehicle control apparatus receives the first signal of the second coils, and the vehicle control apparatus generates a second signal based on the first signal, where the second signal is used to indicate the vehicle to adjust a running track to travel along the predetermined travel direction

FIG. 5

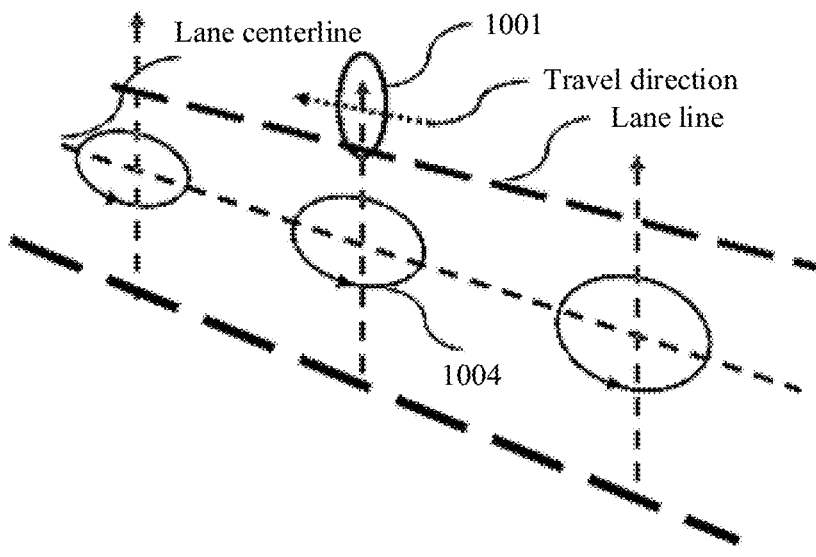

FIG. 6

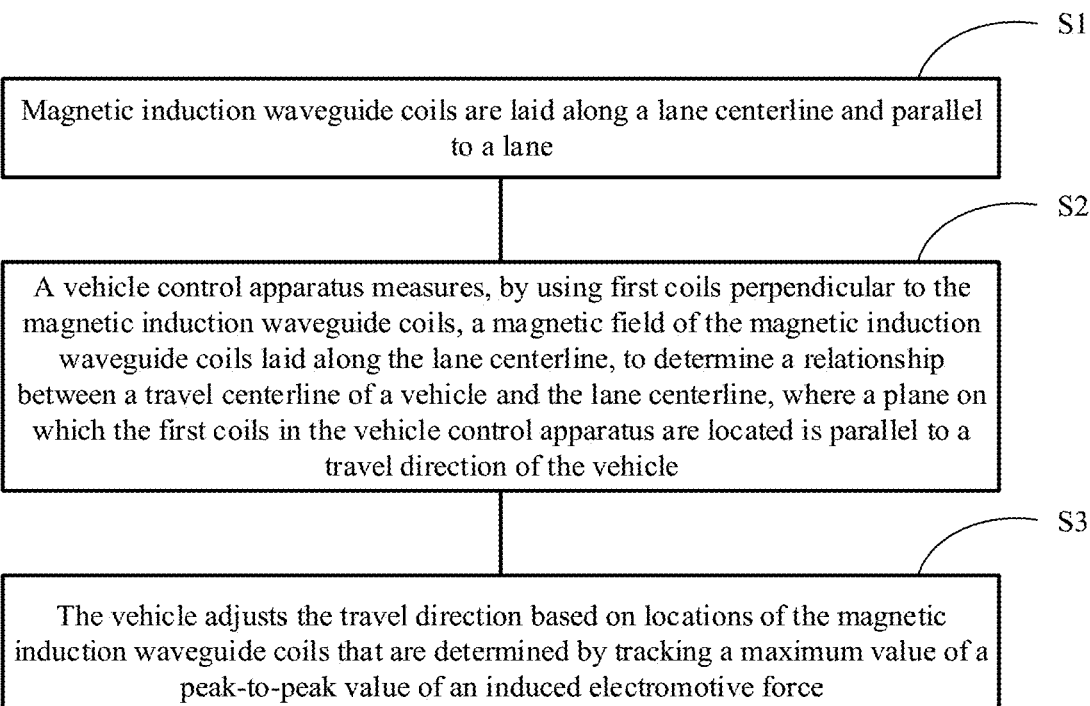

Magnetic induction waveguide coils are laid along a lane centerline and parallel to a lane ⌐ S1

A vehicle control apparatus measures, by using first coils perpendicular to the magnetic induction waveguide coils, a magnetic field of the magnetic induction waveguide coils laid along the lane centerline, to determine a relationship between a travel centerline of a vehicle and the lane centerline, where a plane on which the first coils in the vehicle control apparatus are located is parallel to a travel direction of the vehicle ⌐ S2

The vehicle adjusts the travel direction based on locations of the magnetic induction waveguide coils that are determined by tracking a maximum value of a peak-to-peak value of an induced electromotive force ⌐ S3

FIG. 9

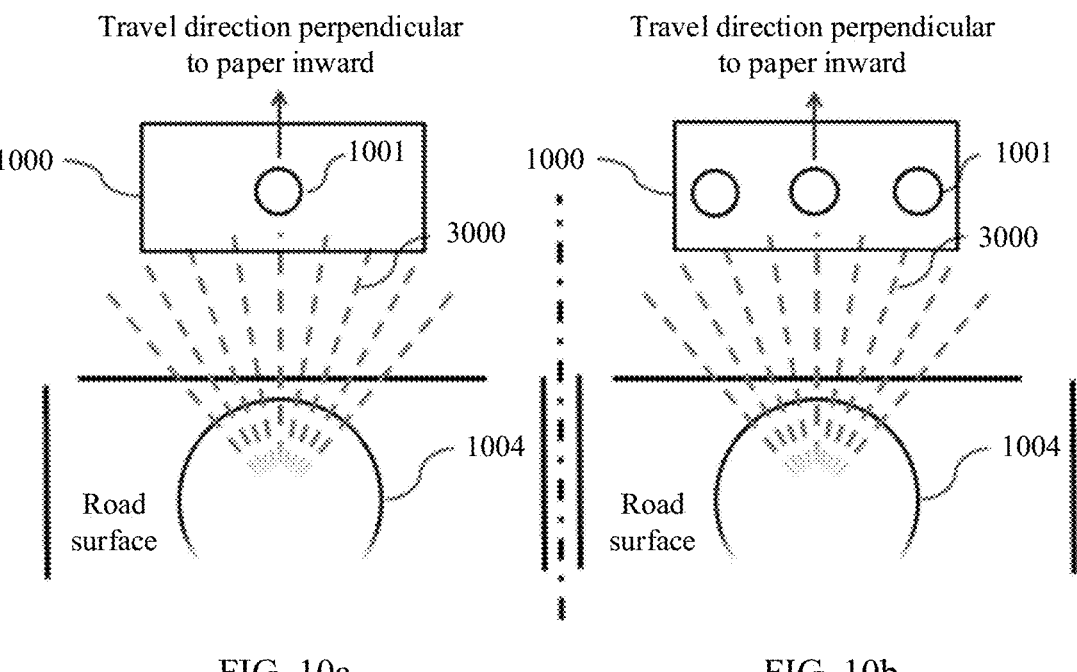

FIG. 10a                    FIG. 10b

MAGNETIC INDUCTION COMMUNICATION-BASED VEHICLE CONTROL APPARATUS AND METHOD

CROSS-REFERENCE TO RELATED APPLICATIONS

This application is a continuation of International Application No. PCT/CN2020/097270, filed on Jun. 20, 2020, which claims priority to Chinese Patent Application No. 201910541482.4, filed on Jun. 21, 2019. The disclosures of the aforementioned applications are hereby incorporated by reference in their entireties.

TECHNICAL FIELD

Embodiments of this application relate to the communications field, and more specifically, to a magnetic induction (MI) communication-based vehicle control apparatus and method.

BACKGROUND

A vehicle-to-everything (V2X) technology incorporates sensors, communications networks, data processing, and automatic control technologies to implement a vehicle-to-vehicle (V2V) connection, a vehicle-to-pedestrian (V2P) connection, and a vehicle-to-infrastructure (V2I) connection. V2X is one of important implementation scenarios of Internet of things (IoT). Connections between a vehicle and various things may be collectively referred to as V2X. V2X is intended to implement information exchange between a vehicle and all entities that may affect the vehicle, so that each vehicle may become any network node through V2X information exchange, and a vehicle network control center can quickly learn of statuses and overall situation of neighboring vehicles or vehicles on roads through information exchange. This helps to improve driving safety, reduce traffic accidents, alleviate traffic congestion, reduce environmental pollution, and provide other information services. Therefore, development of the V2X technology is also one of important parts to implement an intelligent transportation system (ITS).

Currently, in addition to an autonomous driving technology, the V2X technology may be considered as one of the most cutting-edge automotive technologies. Dedicated short-range communications (DSRC) and LTE-V (or referred to as Cellular V2X or cellular network-based V2X (C-V2X)) are two communication standards for V2X. An underlying layer, a physical layer, and radio link control of the DSRC technology are based on IEEE 802.11p of a Wi-Fi ecosystem. An operating frequency band of the DSRC technology is 5.85 GHz to 5.925 GHz, and V2V and V2I cases are supported in US and European markets. However, a main disadvantage of the DSRC technology is that road side units (Road Side Units, RSUs) need to be deployed along roads, in addition to on board units (OBUs) deployed on vehicles. High costs of the RSUs and high deployment costs hinder V2X application to existing roads. In addition, DSRC needs to occupy scarce spectrum resources. If radio frequency communication is used, it is inevitably subject to physical-layer security vulnerabilities. For example, radio frequency communication is susceptible to interception, and information is prone to be interfered with or tampered with. C-V2X is a cellular communication-based V2X technology defined in 3GPP. Based on different interfaces, C-V2X may have two working modes: a V2X-direct (V2X-Direct) mode and a V2X-cellular (V2X-Cellular) mode. C-V2X may use existing cellular network infrastructure for V2X networking, for example, base stations, and can support more extensive and complex services in terms of communication capabilities. However, like DSRC, C-V2X also requires the radio frequency communication technology. Consequently, C-V2X is still confronted with problems such as electromagnetic interference and physical-layer security vulnerabilities of wireless communication.

Magnetic induction communication is a near-field communication technology to transfer information via magnetic fields. In conventional low-efficient scenarios such as radio frequency communication, acoustic wireless communication, and optical wireless communication, magnetic induction communication can make a big difference. Near field communication-based magnetic induction does not radiate signals to a far field, and a private network with a controllable communication range may be generated around a personal network device. Therefore, magnetic induction communication becomes an optimal choice for providing privacy protection and a highly-secure wireless personal area network (WPAN). Currently, an existing magnetic induction communication technology has been used in research and application of in-vehicle computer networks by virtue of the various advantages of magnetic induction communication. However, application of the magnetic induction communication technology in V2X, especially in vehicle control, needs to be developed urgently.

SUMMARY

This application provides a vehicle control apparatus and method, to implement vehicle track control without occupying spectrum resources, and improve security of existing vehicle-to-everything communication.

The following describes this application from a plurality of aspects. It is easy to understand that implementations of the plurality of aspects may be mutually referenced.

According to a first aspect, this application provides a vehicle control apparatus. The vehicle control apparatus includes one or more first coils, a processor, and a communications interface. The one or more first coils are coupled to the processor, and the processor is coupled to the communications interface. The one or more first coils are configured to receive a first signal of second coils laid along a predetermined travel direction. There is a preset relative location relationship between the one or more first coils and the second coils. When a vehicle equipped with the vehicle control apparatus deviates from the predetermined travel direction, the one or more first coils generate an electromotive force signal based on a change in the relative location relationship between the one or more first coils and the second coils. The processor is configured to output a second signal based on the electromotive force signal, where the second signal is used to indicate the vehicle to adjust a running track to travel along the predetermined travel direction.

According to a second aspect, this application provides a vehicle with a lane keeping function and a communications function. The vehicle includes a vehicle control apparatus, a steering system, and a drivetrain. The vehicle control apparatus is coupled to both the steering system and the drivetrain. The vehicle control apparatus includes one or more first coils, a processor, and a communications interface. The one or more first coils are coupled to the processor, and the processor is coupled to the communications interface. The one or more first coils are configured to receive a first signal of second coils laid along a predetermined travel direction. There is a preset relative location relationship between the one or more first coils and the second coils. When a vehicle equipped with the vehicle control apparatus deviates from the predetermined travel direction, the one or more first coils generate an electromotive force signal based on a change in the relative location relationship between the one or more first coils and the second coils. The processor outputs a second signal based on the electromotive force signal, where the second signal is used to indicate the vehicle to adjust a running track to travel along the predetermined travel direction.

It can be learned that the second aspect relates to the vehicle on which the vehicle control apparatus according to the first aspect is installed. In the foregoing two aspects, the vehicle control apparatus determines a lane location based on a characteristic of a spatial structure of magnetic induction lines of the second coils (magnetic waveguides) or a characteristic of spatial distribution of magnetic field energy of the magnetic waveguides. Specifically, the vehicle control apparatus can implement such functions as automatic lane keeping and automatic vehicle distance keeping through magnetic induction communication, and can further implement such a function as automatic lane change by making collaboration in layout of magnetic waveguides on adjacent lanes. Compared with a conventional vision sensor apparatus, the vehicle control apparatus in this application can improve reliability of autonomous driving in various weather and road conditions. In addition, this does not need to construct a large quantity of road side units (RSUs), and does not need to occupy scarce spectrum resources. Magnetic waveguides only need to be laid along the preset travel track. This reduces engineering workload, reduces construction costs, and has low communication power consumption. In addition, this also naturally features higher physical-layer security since near-field communication is insusceptible to interception.

In some implementations of the foregoing aspect, when the vehicle control apparatus is configured to receive the first signal of the second coils laid along the predetermined travel direction, the one or more first coils are perpendicular to the second coils, and the second coils are laid parallel to the ground and arranged in a row along the predetermined travel direction.

For ease of understanding, it may be considered that laying the magnetic waveguides (the second coils) parallel to the ground and only along a lane center is a most cost-effective layout manner, and this is applicable to both a single-lane system and a multi-lane system. Compared with laying the magnetic waveguides underground, laying the magnetic waveguides parallel to the ground has such advantages as a small amount of construction workload, low costs, and rapid layout.

In some implementations of the foregoing aspect, the one or more first coils generate the electromotive force signal when the vehicle deviates from the predetermined travel direction to a first direction. The electromotive force signal includes a first-directional electromotive force. The processor outputs the second signal based on the first-directional electromotive force. The second signal is used to indicate the vehicle to adjust the running track toward a second direction to travel along the predetermined travel direction.

The one or more first coils generate the electromotive force signal when the vehicle deviates from the predetermined travel direction to the second direction. The electromotive force signal includes a second-directional electromotive force. The processor outputs the second signal based on the second-directional electromotive force. The second signal is used to indicate the vehicle to adjust the running track to the first direction to travel along the predetermined travel direction, where the first direction is opposite to the second direction.

In this implementation, a plane on which the one or more first coils in the vehicle control apparatus are located is parallel to a travel direction of the vehicle. An induced current is excited when the vehicle deviates from the predetermined travel direction, and the travel direction of the vehicle is corrected based on different directions of the induced current. The implementation solution is simple and easy to implement.

In some implementations of the foregoing aspect, the one or more first coils generate the electromotive force signal when the vehicle deviates from the predetermined travel direction. The electromotive force signal includes electromotive force amplitude information within a predetermined time interval. The processor outputs the second signal based on the electromotive force amplitude information. The second signal is used to indicate the vehicle to adjust the running track to travel along the predetermined travel direction. The electromotive force amplitude information includes at least one of the following information: a peak-to-peak value of an electromotive force, an absolute value of a maximum value or an absolute value of a minimum value of an electromotive force, and an integral of an electromotive force within an entire or a partial of the predetermined time interval.

More specifically, when filtered electromotive force amplitude information within the predetermined time interval is less than filtered electromotive force amplitude information within a next predetermined time interval, an adjustment direction indicated by the second signal corresponding to the next predetermined time interval is opposite to an adjustment direction indicated by the second signal corresponding to the predetermined time interval.

When the filtered electromotive force amplitude information within the predetermined time interval is greater than the filtered electromotive force amplitude information within the next predetermined time interval, the adjustment direction indicated by the second signal corresponding to the next predetermined time interval is the same as the adjustment direction indicated by the second signal corresponding to the predetermined time interval.

In this implementation and specific content of this implementation, a plane on which the one or more first coils in the vehicle control apparatus are located is perpendicular to the travel direction of the vehicle. An induced current is excited when the vehicle deviates from the predetermined travel direction, and the travel direction is corrected by tracking a characteristic value (for example, a peak-to-peak value) of the induced current within a period. This implementation solution is simple. In this arrangement solution, a single first coil may be used to transmit a signal to a magnetic waveguide for vehicle-to-everything communication.

In some implementations of the foregoing aspect, at least two of the first coils are symmetrically disposed on left and right sides of the vehicle. When the electromotive force amplitude information generated by a first coil on one side is greater than the electromotive force amplitude information generated by a first coil on the other side, the second signal indicates the vehicle to adjust the running track toward a first direction to travel along the predetermined travel direction. When the electromotive force amplitude information generated by the first coil on the one side is less than the electromotive force amplitude information generated by the first coil on the other side, the second signal indicates the vehicle to adjust the running track toward a second direction to travel along the predetermined travel direction, where the first direction is opposite to the second direction.

Inspired by the foregoing implementation, in this implementation, there are at least two first coils in the vehicle control apparatus, and a plane on which the first coils are located is perpendicular to the travel direction of the vehicle. In this solution, an amplitude of a filtered induced electromotive force signal output per unit time by each coil in a receiving coil array is determined. If a coil that outputs a maximum amplitude is not at a center location, a vehicle controller changes the travel direction toward a location of a receiving coil that outputs the maximum amplitude until a coil at the center location is the coil that outputs the maximum amplitude. It can be learned that this implementation is simpler and more direct, and algorithm complexity can be reduced.

In some implementations of the foregoing aspects, the processor is further configured to receive a third signal from the communications interface. The communications interface is configured to receive a signal from the vehicle equipped with the vehicle control apparatus. The processor generates an electromotive force signal based on the third signal. The first coils are configured to send a fourth signal based on the electromotive force signal. The fourth signal is used to identify the vehicle equipped with the vehicle control apparatus and indicate running information of the vehicle.

It can be learned that the magnetic waveguides (the second coils) perform both wireless sensing and wireless communication. The magnetic waveguides are used to transfer signals to vehicles or facilities on near-field magnetic induction communication highways while magnetic induction location identification is built by using the magnetic waveguides. This implements V2X communication. In the implementation of this aspect, a physical-layer air interface technology is used to accomplish two objectives.

In some implementations of the foregoing aspect, the vehicle control apparatus communicates with a vehicle control unit (VCU) through a bus. The vehicle control unit (VCU) is configured to coordinate and control a vehicle power system.

Optionally, in some implementations of the foregoing aspect, the communications interface is configured to receive at least one of the following signals: a bus signal from the vehicle equipped with the vehicle control apparatus and a wireless signal.

Specifically, in some implementations of the foregoing aspect, the vehicle control apparatus communicates with an in-vehicle dedicated processor. The in-vehicle dedicated processor is configured to run an in-vehicle infotainment (IVI) system.

In some implementations of the foregoing aspect, the vehicle control apparatus further includes a wireless communications module. The wireless communications module is coupled to the processor. The wireless communications module is configured to communicate with a core network through a radio access network.

In some implementations of the foregoing aspect, a network element in a communications network generates the first signal. The network element is coupled to at least one of the second coils. The network element includes a vehicle equipped with the vehicle control apparatus and transportation infrastructure.

In some implementations of the foregoing aspect, the vehicle control apparatus includes a wireless communications module. The wireless communications module is configured to communicate with a core network through a radio access network.

It can be learned that transmission of small-amount control information in such communication as V2V, V2I, and V2P may not occupy air interface resources of a cellular network, and an end-to-end delay can be reduced. In addition, the vehicle that is equipped with the vehicle control apparatus and that travels on the magnetic waveguides may be connected to the cellular network, or the magnetic waveguides may be connected to a repeater or a mobile base station. Magnetic waveguide-based V2X may become a part of the cellular network, thereby providing auxiliary or enhancement for C-V2X functions and coverage capabilities. The magnetic waveguides are used to transfer signals to vehicles or facilities on near-field magnetic induction communication highways while magnetic induction location identification is built by using the magnetic waveguides. This implements V2X communication.

According to a third aspect, this application provides a vehicle control method. The method includes: Second coils laid along a predetermined travel direction transmit a first signal, where the second coils are laid parallel to the ground and arranged in a row along the predetermined travel direction; a vehicle equipped with a vehicle control apparatus receives the first signal of the second coils; and the vehicle control apparatus generates a second signal based on the first signal, where the second signal is used to indicate the vehicle to adjust a running track to travel along the predetermined travel direction.

It can be learned that the vehicle control apparatus determines a lane location based on a characteristic of a spatial structure of magnetic induction lines of the second coils (magnetic waveguides) or a characteristic of spatial distribution of magnetic field energy of the magnetic waveguides. Specifically, the vehicle control apparatus can implement such functions as automatic lane keeping and automatic vehicle distance keeping, and can further implement such a function as automatic lane change by making collaboration in layout of magnetic waveguides on adjacent lanes. In particular, compared with a conventional vision sensor apparatus, the vehicle control apparatus in this application can improve reliability of autonomous driving in various weather and road conditions. In addition, this does not need to construct a large quantity of road side units (RSUs), and does not need to occupy scarce spectrum resources. Magnetic waveguides only need to be laid along the preset travel track. This reduces engineering workload, reduces construction costs, and has low communication power consumption. In addition, this also naturally features higher physical-layer security since near-field communication is insusceptible to interception. For ease of understanding, it may be considered that laying the magnetic waveguides (the second coils) parallel to the ground and only along a lane center is a most cost-effective layout manner, and this is applicable to both a single-lane system and a multi-lane system. Compared with laying the magnetic waveguides underground, laying the magnetic waveguides parallel to the ground has such advantages as a small amount of construction workload, low costs, and rapid layout.

In some implementations of the foregoing aspect, a network element in a communications network generates the first signal. The network element is coupled to at least one of the second coils. The network element includes a vehicle equipped with the vehicle control apparatus and transportation infrastructure.

It can be learned that the second coils (the magnetic waveguides) perform both wireless sensing and wireless communication. The magnetic waveguides are used to transfer signals to vehicles or facilities on near-field magnetic induction communication highways while magnetic induction location identification is built by using the magnetic waveguides. This implements V2X communication. In the implementation of this aspect, a physical-layer air interface technology is used to accomplish two objectives.

In some implementations of the foregoing aspect, the vehicle control apparatus receives a third signal of the vehicle equipped with the vehicle control apparatus. The vehicle control apparatus sends a fourth signal to the second coils based on the third signal, where the fourth signal is used to identify the vehicle equipped with the vehicle control apparatus and indicate running information of the vehicle.

Specifically, when the vehicle control apparatus sends the fourth signal, the second coils transfer the fourth signal to another vehicle or network element that can be communicated in a network. Alternatively, the second coils amplify and transfer the fourth signal to another vehicle or network element that can be communicated in a network.

In some implementations of the foregoing aspect, a resonance frequency of magnetic waveguide coils is tunable, and the resonance frequency is tuned by using a peripheral adaptive coupled control circuit.

In some implementations of the foregoing aspect, the magnetic waveguide coils are laid underground. Alternatively, the magnetic waveguide coils are fastened on a road surface.

In this embodiment of this application, the one or more first coils in the vehicle control apparatus receive the first signal of the second coils laid along the predetermined travel direction. There is a preset relative location relationship between the one or more first coils and the second coils. When the vehicle equipped with the vehicle control apparatus deviates from the predetermined travel direction, the one or more first coils generate the electromotive force signal based on the change in the relative location relationship between the one or more first coils and the second coils. The processor outputs the second signal based on the electromotive force signal, where the second signal is used to indicate the vehicle to adjust a running track to travel along the predetermined travel direction. The vehicle control apparatus can implement such a function as automatic lane keeping, and is more reliable in specific scenarios. In addition, this does not need to occupy spectrum resources, and features security of near-field communication. In addition, the second coils (magnetic waveguides) can transmit signals to vehicles or facilities on near-field magnetic induction communication highways, to implement V2X communication.

BRIEF DESCRIPTION OF DRAWINGS

The following describes accompanying drawings used in embodiments of this application.

FIG. 4 shows a vehicle 2000 with a lane keeping function and a communication function according to an embodiment of this application;

FIG. 5 is a block diagram of a vehicle control method according to an embodiment of this application;

FIG. 6 is a schematic diagram of a relative location of a vehicle control apparatus to ground magnetic waveguides;

FIG. 9 is a flowchart of another vehicle control method according to an embodiment of this application;

FIG. 10a is a schematic diagram of detecting a location of a second coil (a magnetic waveguide coil) by using a single first coil;

FIG. 10b is a schematic diagram of detecting a location of a second coil (a magnetic waveguide coil) by using a first coil array;

DESCRIPTION OF EMBODIMENTS

Figure 1A:
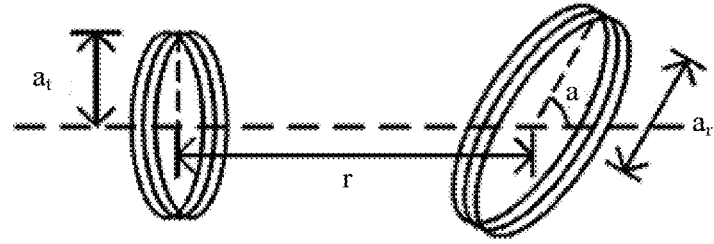
FIG. 1a is a schematic diagram of an MI transceiver in a magnetic induction communication channel model.

The following describes the technical solutions in the embodiments of this application with reference to the accompanying drawings in the embodiments of this application. In descriptions in the embodiments of this application, "I" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of the embodiments of this application, the terms "first" and "second" are merely intended for description, and shall not be understood as an indication or implication of relative importance or implicit indication of a quantity of indicated technical features. Therefore, a feature limited by "first", "second", or the like may explicitly or implicitly include one or more features. In the descriptions of the embodiments of this application, "a plurality of" means two or more, unless otherwise specified.

Terminologies such as "component", "module", and "system" used in this application are used to indicate computer-related entities, hardware, firmware, a combination of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may perform communication by using a local and/or remote process and based on, for example, a signal having one or more data packets (for example, data from two components interacting with another component in a local system, a distributed system, and/or across a network such as the Internet interacting with other systems by using the signal). It should be noted that sequence numbers in the method embodiments of this application only serve a function of identifying the steps in the method, but does not restrict a sequence of the numbered steps.

Before specific embodiments of this application are described, a used magnetic induction principle is first described.

The magnetic induction (MI) principle is derived from Faraday's law of electromagnetic induction. The Faraday's law states that an electromotive force around a closed path is equal to a change of a magnetic flux enclosed by the path. Considering that the closed circuit has N turns of coils, the law may be expressed as the following formula:

$$\varepsilon = -N \frac{\Delta \phi_B}{\Delta_t} \qquad (1)$$

N represents a quantity of coils, and $\phi_B$ represents the magnetic flux, where the magnetic flux $\phi_B$ is defined as a product of a magnetic field strength and a projected coil area:

$$\phi_B = B \perp A = BA \sin \alpha \qquad (2)$$

Figure 1B:
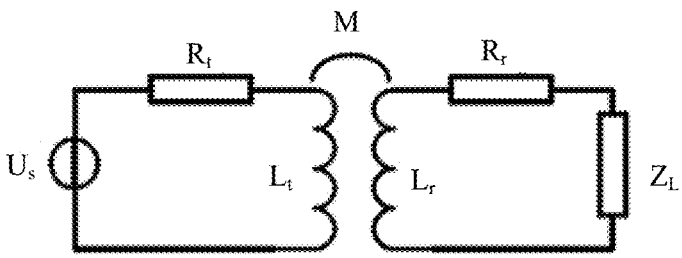
FIG. 1b is a schematic diagram of a coupler model in a magnetic induction communication channel model.
Figure 1C:
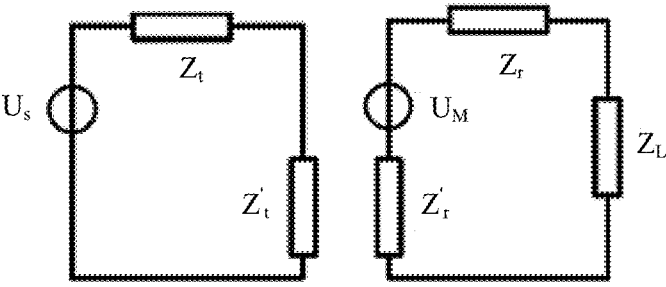
FIG. 1c is a schematic diagram of an equivalent circuit of a coupler model in a magnetic induction communication channel model.

B represents the magnetic field strength, and A represents the coil area. If magnetic induction communication needs to be implemented, a system necessary includes a pair of closed loops: one for transmitting signals and the other for receiving signals. FIG. 1 is a schematic diagram of a magnetic induction communication channel model. FIG. 1a, FIG. 1b, and FIG. 1c are schematic diagrams of an MI transceiver, a coupler model, and an equivalent circuit respectively. As shown in FIG. 1a, $\alpha_t$ and $\alpha_r$ represent a radius of a transmitting coil and a radius of a receiving coil respectively, r represents a distance between a transmitter and a receiver, and (90°−α) represents an angle between axes of the two coupled coils.

It is assumed that a signal in a transmitting coil at a transmit end is a sinusoidal current, for example, $I = I_0 \cdot e^{-j\omega t}$, where ω represents an angular frequency of a transmitted signal. According to the Faraday's law of electromagnetic induction, an alternating current at the transmit end generates an alternating magnetic field, and there is an alternating magnetic flux in coils at a receive end to generate an alternating current at the receive end. This is a basic process of magnetic induction communication.

In terms of application, magnetic induction communication is a near-field communication technology that uses a magnetic field to transmit information. The magnetic induction communication features channel invariance (independent of parameter transformation in a space-time channel environment), delay negligibility, and long-coverage distance in an underwater wireless sensor network (UWSN) and a wireless underground sensor network (WUSN). In conventional low-efficient scenarios such as radio frequency communication, acoustic wireless communication, and optical wireless communication, magnetic induction communication can make a big difference to enable wireless networks to be used underground and underwater. Near field communication (NFC)-based magnetic induction does not radiate signals to a far field, and a private network whose communication range is controllable may be generated around a personal network device. Therefore, MI communication becomes an optimal choice for providing privacy protection and a high security-level wireless personal area network (WPAN).

Based on an MI principle, this application provides a vehicle control apparatus and method, and a vehicle equipped with the vehicle control apparatus. The vehicle control apparatus and method, and the vehicle equipped with the vehicle control apparatus may be used in autonomous driving, vehicle-to-everything, an intelligent transportation system (ITS), and various scenarios in which wireless local communication and wireless sensing are required. The vehicle control apparatus and method, and the vehicle equipped with the vehicle control apparatus may be further used in other scenarios of Internet of Things (IoT), such as smart factories, smart shelves, smart parking lots, and large ship decks.

Before the specific embodiments are described, concepts used in systems in the embodiments of this application are first described.

Magnetic induction waveguide (magnetic waveguide): Communication performed by using magnetic induction signals is a near-field communication manner. A propagation distance of the magnetic induction signals is limited, which is usually less than one wavelength. However, if a plurality of passive coils are laid along a specified direction, when an alternating current causes a change in a magnetic flux in a coil, an adjacent coil of the coil is induced to generate an alternating current, and accordingly, a next adjacent coil is further induced to generate an alternating current in this process. As the repeated process is like a propagating wave, this is the origin of the magnetic induction waveguide. A magnetic induction waveguide can provide passive relay transferring of a magnetic induction signal, form a network communication channel, and transfer a location reference signal for wireless magnetic induction sensing. The magnetic induction waveguide/magnetic waveguide is also referred to as a second coil in this application. They convey a same meaning and are not distinguished between each other.

In-vehicle receiving coil: An in-vehicle receiving coil can detect a magnetic field characteristic of a magnetic waveguide to sense a relationship between a current travel direction of a vehicle and a location at which the magnetic induction waveguide is laid, and receive communication signals sent by other devices in a magnetic induction communications network.

In-vehicle transmitting coil: An in-vehicle transmitting coil can provide a magnetic induction waveguide with navigation energy for generating wireless magnetic induction sensing, and send communication signals to other devices in the magnetic induction communications network. A quantity of in-vehicle receiving coils and a quantity of in-vehicle transmitting coils may be adjusted depending on specific application requirements. The in-vehicle receiving coil and the in-vehicle transmitting coil may be integrated into an in-vehicle transceiver coil, which operates at different frequencies for transmission and receiving. Similarly, a quantity of in-vehicle transceiver coils may be adjusted as required. For ease of understanding, in this application document, the in-vehicle receiving coil, the in-vehicle transmitting coil, and the in-vehicle transceiver coil are collectively referred to as a first coil. They convey a same meaning and are not distinguished between each other.

Figure 2:
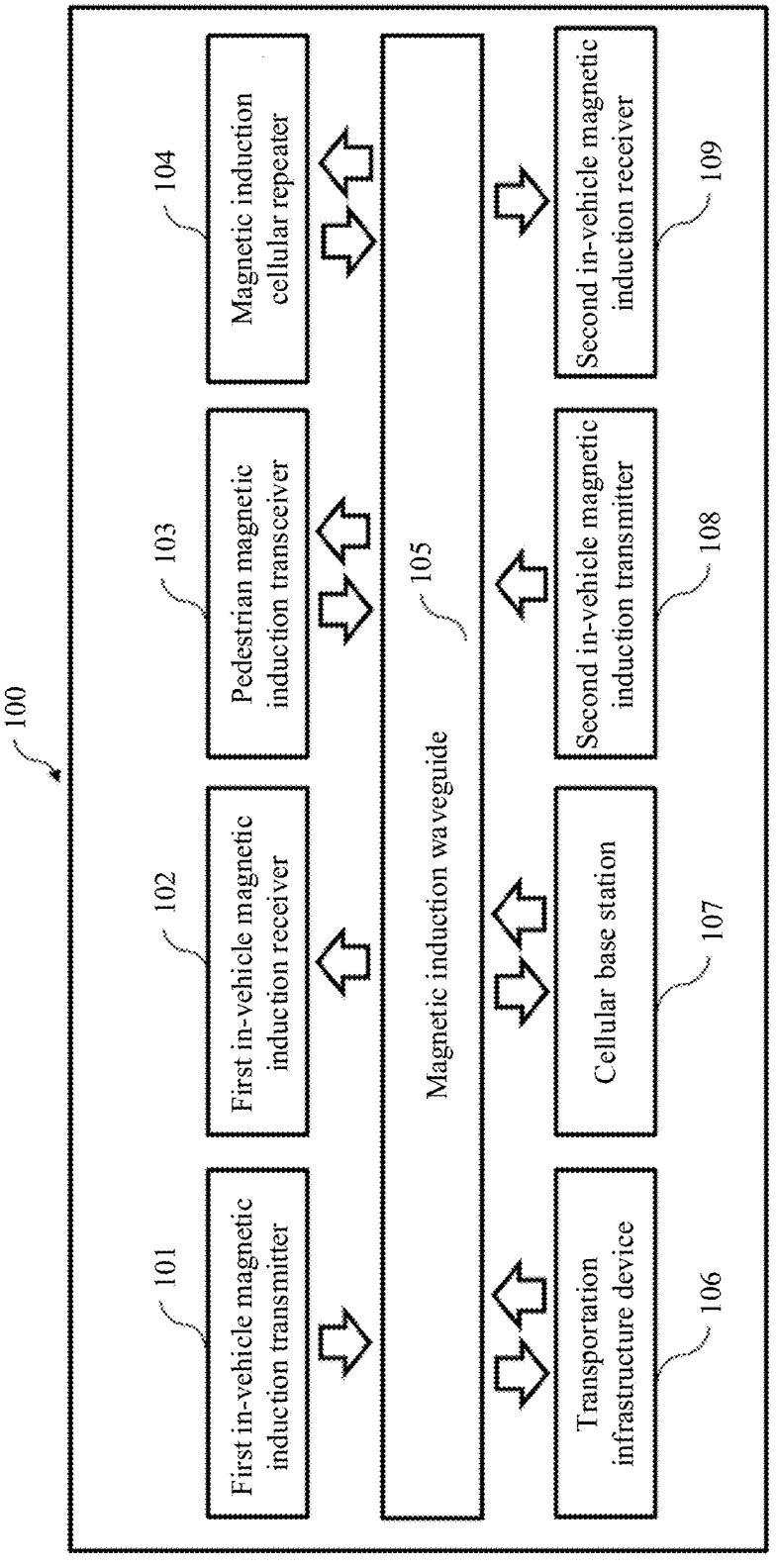
FIG. 2 is a block diagram of a magnetic induction waveguide-based magnetic induction communication system according to an embodiment of this application.

FIG. 2 is a block diagram of a magnetic induction waveguide-based magnetic induction communication system 100 according to an embodiment of this application. The system implements a combination of wireless local area network communication and wireless sensing. The system includes a magnetic induction waveguide 105, a first in-vehicle magnetic induction transmitter 101, and a first in-vehicle magnetic induction receiver 102. The system may further include: a second in-vehicle magnetic induction transmitter 108, a second in-vehicle magnetic induction receiver 109, a pedestrian magnetic induction transceiver 103, a magnetic induction cellular repeater 104, a transportation infrastructure device 106, a cellular base station 107, and the like. It is easy to understand that the in-vehicle magnetic induction transmitter and the in-vehicle magnetic induction receiver each may implement related functions by using one coil or one type of coils in a vehicle control apparatus, or may implement related functions by using two coils or two types of coils. In addition, the vehicle control apparatus may include only the in-vehicle magnetic induction transmitter or the in-vehicle magnetic induction receiver, considering costs, functional limitations, or other factors. The magnetic induction waveguide provides relay transferring of a magnetic induction signal, forms a network communication channel, and transfers a location reference signal for wireless magnetic induction sensing. An in-vehicle transmitting coil can provide the magnetic induction waveguide with navigation energy for generating wireless magnetic induction sensing, and send communication signals to other devices in a magnetic induction communications network. An in-vehicle receiving coil can detect a magnetic field characteristic of a magnetic waveguide to sense a relationship between a current travel direction of a vehicle and a location at which the magnetic induction waveguide is laid, and receive communication signals sent by other devices in the magnetic induction communications network.

The repeater 104 connected to the magnetic induction communications network in the magnetic induction communication system forwards the magnetic induction signal and the wireless cellular signal, to implement V2N communication. The pedestrian magnetic induction transceiver 103 connected to the magnetic induction communications network implements V2P communication. The transportation infrastructure device 106 connected to the magnetic induction network implements V2I communication. The cellular base station 107 connected to the magnetic induction communications network implements V2N communication. The pedestrian magnetic induction transceiver 103, the magnetic induction cellular repeater 104, the traffic infrastructure device 106, the cellular base station 107, or the like may be approximately considered as the vehicle (another network element) on which the vehicle control apparatus is installed in a magnetic induction communications network, to implement a related function of the in-vehicle control apparatus, especially a communication function in the magnetic induction communications network.

The embodiments of this application focus on a structure and a working principle of the vehicle control apparatus, and a method for interacting between the vehicle control apparatus and a magnetic waveguide.

Figure 3:
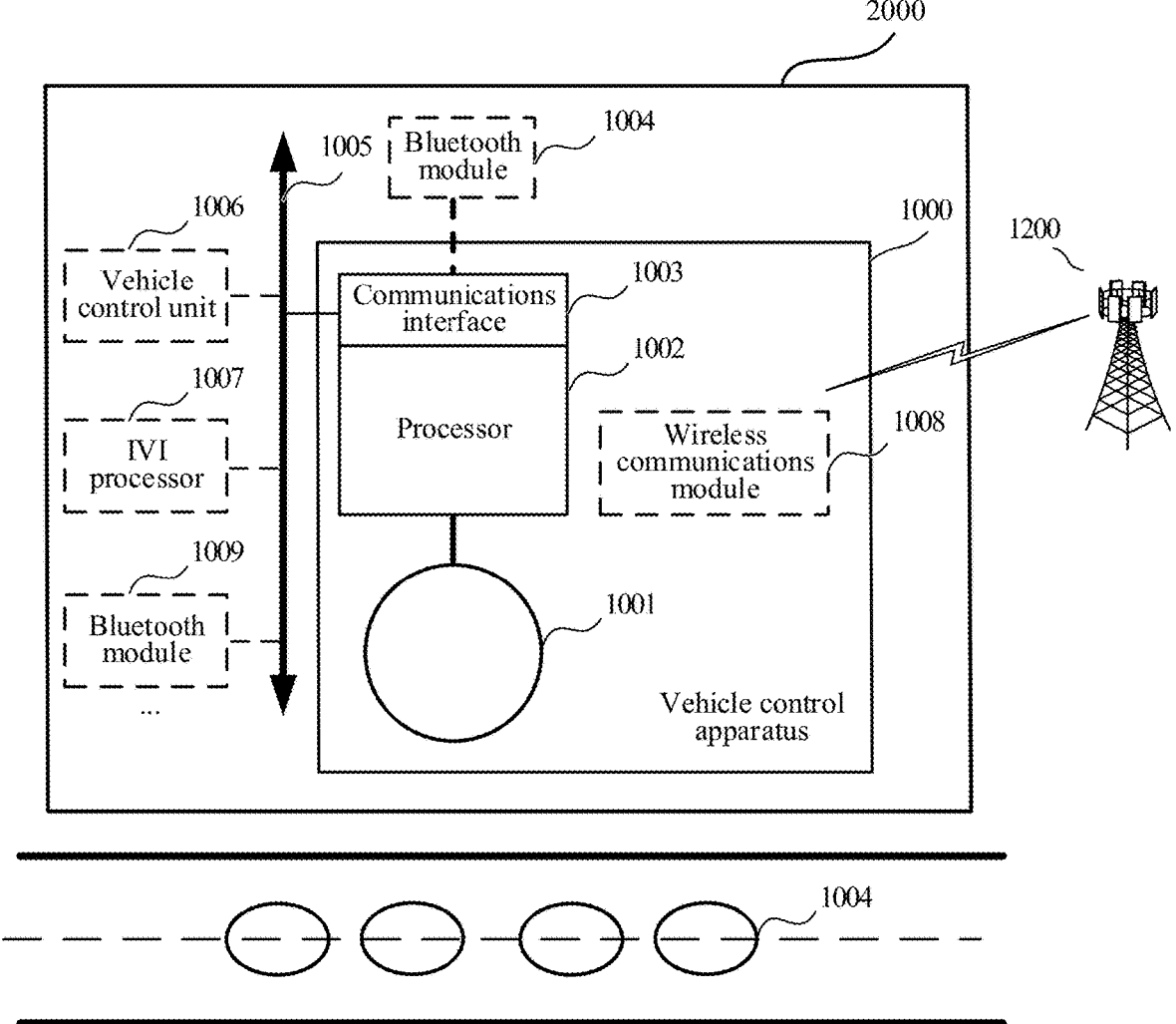
FIG. 3 shows a vehicle control apparatus 1000 according to an embodiment of this application.

FIG. 3 shows a vehicle control apparatus 1000 according to an embodiment of this application. The vehicle control apparatus 1000 includes one or more first coils 1001, a processor 1002, and a communications interface 1003. The one or more first coils 1001 are coupled to the processor 1002, and the processor 1002 is coupled to the communications interface 1003. The one or more first coils 1001 are configured to receive a first signal of second coils 1004 laid along a predetermined travel direction. There is a preset relative location relationship between the one or more first coils 1001 and the second coils 1004. When a vehicle 2000 equipped with the vehicle control apparatus deviates from the predetermined travel direction, the one or more first coils 1001 generate an electromotive force signal based on a change in the relative location relationship between the one or more first coils 1001 and the second coils 1004. The processor 1002 is configured to output a second signal based on the electromotive force signal, where the second signal is used to indicate the vehicle 2000 to adjust a running track to travel along the predetermined travel direction.

The first signal may be generated by a network element in a communications network, where the network element is coupled to at least one of the second coils. The network element may be a vehicle equipped with the vehicle control apparatus, a transportation infrastructure device, or another vehicle.

It can be learned from the relative locations of the two types of coils, when the vehicle control apparatus is configured to receive the first signal of the second coils 1004 laid along the predetermined travel direction, the one or more first coils 1001 are perpendicular to the second coils 1004, and the second coils 1004 are laid parallel to the ground and arranged in a row along the predetermined travel direction. For ease of understanding, it may be considered that laying magnetic waveguides (the second coils) 1004 parallel to the ground and only along a lane center is a most cost-effective layout manner, and this is applicable to both a single-lane system and a multi-lane system. Compared with laying the magnetic waveguides underground, laying the magnetic waveguides parallel to the ground has such advantages as a small amount of construction workload, low costs, and rapid layout.

Optionally, this application provides a first lane keeping solution based on the vehicle control apparatus 1000. When the vehicle deviates from the predetermined travel direction toward a first direction (for example, leftward), the one or more first coils 1001 generate the electromotive force signal. The electromotive force signal includes a first-directional electromotive force. The processor 1002 outputs the second signal based on the first-directional electromotive force, where the second signal is used to indicate the vehicle to adjust the running track toward a second direction (for example, right) to travel along the predetermined travel direction.

When the vehicle deviates from the predetermined travel direction toward a second direction (for example, rightward), the one or more first coils 1001 generate the electromotive force signal. The electromotive force signal includes a second-directional electromotive force. The processor outputs the second signal based on the second-directional electromotive force, where the second signal is used to indicate the vehicle to adjust the running track toward left to travel along the predetermined travel direction.

In this specific embodiment, a plane on which the one or more first coils 1001 in the vehicle control apparatus 1000 are located is parallel to a travel direction of the vehicle. An induced current is excited when the vehicle deviates from the predetermined travel direction, and the travel direction of the vehicle is corrected based on different directions of the induced current. The implementation solution is simple and easy to implement.

Optionally, a second lane keeping solution is provided based on the vehicle control apparatus 1000. Different from the first method for determining a deviation direction based on a direction of an induced electromotive force, correction is performed by tracking a maximum value of electromotive force amplitude information in the second solution.

The one or more first coils 1001 generate the electromotive force signal when the vehicle deviates from the predetermined travel direction. The electromotive force signal includes electromotive force amplitude information within a predetermined time interval. The processor 1002 outputs the second signal based on the electromotive force amplitude information. The second signal is used to indicate the vehicle to adjust the running track to travel along the predetermined travel direction, and the electromotive force amplitude information includes at least one of the following information: a peak-to-peak value of an electromotive force, an absolute value of a maximum value or an absolute value of a minimum value of an electromotive force, and an integral of an electromotive force within an entire or a partial of the predetermined time interval.

More specifically, when filtered electromotive force amplitude information within the predetermined time interval is less than filtered electromotive force amplitude information within a next predetermined time interval (it is considered that a to-be-corrected direction of the vehicle within the next predetermined time interval is incorrect, and the processor determines that an adjustment direction should be opposite to the to-be-corrected direction of the vehicle), an adjustment direction indicated by the second signal corresponding to the next predetermined time interval is opposite to an adjustment direction indicated by the second signal corresponding to the predetermined time interval. In a specific embodiment, if the adjustment direction indicated by the second signal corresponding to the predetermined time interval is rightward, but a filtered peak-to-peak value of the electromotive force within the predetermined time interval is less than a filtered peak-to-peak value of the electromotive force within a next predetermined time interval, the adjustment direction indicated by the second signal corresponding to the next predetermined time interval is leftward. When the filtered electromotive force amplitude information within the predetermined time interval is greater than the filtered electromotive force amplitude information within the next predetermined time interval (it is considered that a to-be-corrected direction of the vehicle within the next predetermined time interval is correct, and the processor determines that an adjustment direction should be the same as the to-be-corrected direction of the vehicle. More specifically, a steering angle may be determined based on a variable about filtered electromotive force amplitude information of two time intervals. For example, if the variable exceeds a threshold, the steering angle is decreased; if the variable does not exceed the threshold, the steering angle is increased or kept unchanged. Similarly, a travel speed of the vehicle is the same case), an adjustment direction indicated by the second signal corresponding to the next predetermined time interval is the same as an adjustment direction indicated by the second signal corresponding to the predetermined time interval. In a specific embodiment, if the adjustment direction indicated by the second signal corresponding to the predetermined time interval is rightward, but the filtered peak-to-peak value of the electromotive force within the predetermined time interval is greater than the filtered peak-to-peak value of the electromotive force within the next predetermined time interval, the adjustment direction indicated by the second signal corresponding to the next predetermined time interval is kept rightward.

In this implementation and specific content of this implementation, a plane on which the one or more first coils in the vehicle control apparatus are located is perpendicular to the travel direction of the vehicle. An induced current is excited when the vehicle deviates from the predetermined travel direction, and the travel direction is corrected by tracking a characteristic value (for example, a peak-to-peak value) of the induced current within a period. This implementation solution is simple. In this arrangement solution, a single first coil may be used to transmit a signal to a magnetic waveguide for vehicle-to-everything communication.

Optionally, a third lane keeping solution is provided based on the vehicle control apparatus 1000. For this solution, refer to FIG. 10*b* and corresponding descriptions. Different from the first method for determining a deviation direction based on a direction of an induced electromotive force, correction is performed by tracking a maximum value of electromotive force information by using two or more coils in the third solution that is based on the second solution.

Specifically, at least two of the first coils are symmetrically disposed on left and right sides of the vehicle. When electromotive force amplitude information generated by a first coil on one side (for example, the left side) is greater than electromotive force amplitude information generated by the other first coil on the other side (for example, the right side), the second signal indicates the vehicle to adjust the running track toward the first direction (for example, the left side) to travel along the predetermined travel direction. When the electromotive force amplitude information generated by the first coil on the one side (for example, the left side) is less than the electromotive force amplitude information generated by the first coil on the other side (for example, the right side), the second signal indicates the vehicle to adjust the running track toward the second direction (for example, the right side) to travel along the predetermined travel direction. The first direction is opposite to the second direction. It may be understood that the left side and the right side herein are relative concepts. From a direction facing the vehicle head and a direction facing a parking space, the left side and right side may be exchanged. However, in this embodiment of this application, both the left side and the right side are determined by using one direction (the direction facing the vehicle head or the direction facing a parking space) as a reference. In one implementation scenario, one reference direction is used.

In this implementation, there are at least two first coils in the vehicle control apparatus, and a plane on which the first coils are located is perpendicular to the travel direction of the vehicle. In an embodiment, refer to FIG. 10*b*. An apparatus includes three first coils 1001, a travel direction of a vehicle equipped with the apparatus is perpendicular to paper inward, and the three coils 1001 are fastened in the vehicle control apparatus 1000. A plane on which the coils 1001 are located is perpendicular to the travel direction of the vehicle. In this solution, an amplitude of a filtered induced electromotive force signal output per unit time by each coil in a receiving coil array is determined. If a coil that outputs a maximum amplitude is not at a center location, a vehicle controller changes the travel direction toward a location of a receiving coil that outputs the maximum amplitude until a coil at the center location is the coil that outputs the maximum amplitude. It can be learned that this implementation is simpler and more direct, and algorithm complexity can be reduced.

It can be learned that the vehicle control apparatus determines a lane location based on a characteristic of a spatial structure of magnetic induction lines of the second coils (magnetic waveguide coils 1004) or a characteristic of spatial distribution of magnetic field energy of the magnetic waveguide. Specifically, the vehicle control apparatus 1000 may replace a conventional vision sensor apparatus to implement such functions as automatic lane keeping and automatic vehicle distance keeping, and can further implement such a function as automatic lane change by making collaboration in layout of magnetic waveguides on adjacent lanes. In particular, compared with the conventional vision sensor apparatus, the vehicle control apparatus 1000 in this application can improve reliability of autonomous driving in various weather and road conditions. For example, a night vision sensor depends on a lighting effect of lights of a vehicle and street lamps. The vehicle control apparatus 1000 implements lane keeping based on magnetic induction communication, without depending on ambient light in principle. In addition, magnetic induction communication is performed between the vehicle control apparatus 1000 and magnetic waveguide coils 1004 that are used together with the vehicle control apparatus 1000, thereby avoiding occupying resources that are required in conventional radio frequency communication. Compared with a conventional radio frequency communication-based lane keeping method, this does not need to construct a large quantity of road side units (RSUs), and does not need to occupy scarce spectrum resources. The magnetic waveguide coils 1004 only need to be laid along the preset travel track. This reduces engineering workload, reduces construction costs, and has low communication power consumption. In addition, this also naturally features higher physical-layer security since near-field communication is insusceptible to interception.

The processor 1002 may be further configured to receive a third signal from the communications interface 1003. The communications interface 1003 is configured to receive a signal from the vehicle 2000 equipped with the vehicle control apparatus. The processor 1002 generates an electromotive force signal based on the third signal. The one or more first coils 1001 are configured to send a fourth signal based on the electromotive force signal. The fourth signal is used to identify the vehicle equipped with the vehicle control apparatus and indicate running information of the vehicle. In addition to measuring a magnetic field of the second coils, the vehicle control apparatus 1000 may further send, by using the one or more first coils 1001, an identifier and information of the vehicle in a form of a magnetic induction signal, that is, the fourth signal. The third signal may be a current speed of the vehicle, a change in the speed per unit time, information about an infrastructure device received by the vehicle, and other content.

The vehicle control apparatus 1000 receives the third signal of the vehicle 2000 equipped with the vehicle control apparatus. The vehicle control apparatus 1000 sends the fourth signal to the second coils 1004 based on the third signal, where the fourth signal is used to identify the vehicle equipped with the vehicle control apparatus and indicate running information of the vehicle.

Specifically, when the vehicle control apparatus 1000 sends the fourth signal, the second coils 1004 transfer the fourth signal to another vehicle or network element that supports magnetic induction communication. Alternatively, the second coils 1004 amplify and transfer the fourth signal to another vehicle or network element that supports magnetic induction communication.

Optionally, the vehicle control apparatus 1000 communicates with a vehicle control unit (VCU) 1006 through a bus 1005. The vehicle control unit (VCU) 1006 is configured to coordinate and control a vehicle power system. Generally, the VCU stores information related to a vehicle drivetrain, and the related information is transferred to the vehicle control apparatus 1000 through the bus. The vehicle control apparatus 1000 may also transfer vehicle track adjustment information to the VCU.

Optionally, in some implementations of the foregoing aspect, the communications interface is configured to receive at least one of the following signals: a bus signal from the vehicle equipped with the vehicle control apparatus and a wireless signal. The wireless signal may come from a Bluetooth module 1009 coupled to the communications interface. The Bluetooth module 1009 may communicate with another Bluetooth module 1009 on the vehicle equipped with the vehicle control apparatus.

Specifically, in some implementations of the foregoing aspect, the vehicle control apparatus 1000 communicates with an in-vehicle dedicated processor 1007. The in-vehicle dedicated processor is configured to run an in-vehicle infotainment (IVI) system.

In some implementations of the foregoing aspect, the vehicle control apparatus further includes a wireless communications module 1008. The wireless communications module 1008 is coupled to the processor 1002. The wireless communications module 1008 is configured to communicate with a core network through a radio access network 1200.

It can be learned that transmission of small-amount control information (for example, information about emergency braking or sudden lane change) in such communication as V2V, V2I, and V2P may not occupy air interface resources of a cellular network. This can reduce an end-to-end delay, and improve driving safety. In addition, the vehicle that is equipped with the vehicle control apparatus and that travels on the magnetic waveguides may be connected to the cellular network, so that magnetic waveguide-based V2X may become a part of the cellular network. This provides auxiliary or enhancement for C-V2X functions and coverage capabilities. The magnetic waveguides are used to transfer signals to vehicles or facilities on near-field magnetic induction communication highways while magnetic induction location identification is built by using the magnetic waveguides. This implements V2X communication.

For implementation and application consideration, FIG. 4 shows a vehicle 2000 with a lane keeping function and a communication function according to an embodiment of this application. The vehicle 2000 includes a vehicle control apparatus 1000, a steering system 2001, and a drivetrain 2002. The vehicle control apparatus 1000 is coupled to both the steering system 2001 and the drivetrain 2002 through a bus 2003. The vehicle control apparatus 1000 has same functions as the foregoing vehicle control apparatus, and details are not described again. Only connections of a communications interface and installation and fastening of the vehicle control apparatus are newly added content. An output signal of the vehicle control apparatus is used to indicate the steering system 2001 and the drivetrain 2002 to adjust a running track to travel along a predetermined travel direction. This may be considered as a specific application of the vehicle control apparatus. The steering system 2001 refers to a series of apparatuses for changing or maintaining a driving or reverse direction of a vehicle. The drivetrain 2002 generally includes a clutch, a transmission, a universal transmission, a main reducer, a differential, a half shaft, and the like. A basic function of the steering system 2001 is to transmit power from an engine to driving wheels of the vehicle to generate a driving force, so that the vehicle can travel at a speed.

Based on the vehicle control apparatus, in a magnetic induction communication-based transportation system, the vehicle 2000 equipped with the vehicle control apparatus may be further configured to actively send information about the vehicle equipped with the apparatus to the magnetic waveguides 1004, to exchange information with another network element coupled to the magnetic waveguides, where another network element may be another vehicle that can communicate with the another network element, an infrastructure device, a cellular network supporting magnetic induction communication.

It can be learned that the magnetic waveguides (second coils) 1004 can perform both wireless sensing and wireless communication. The magnetic waveguides are used to transfer signals to vehicles or facilities on near-field magnetic induction communication highways while magnetic induction location identification is built by using the magnetic waveguides. This implements V2X communication. In the implementation of this aspect, a physical-layer air interface technology is used to accomplish two objectives.

According to the foregoing vehicle control apparatus or the vehicle equipped with the apparatus, FIG. 5 is a block diagram of a vehicle control method according to an embodiment of this application. For the method, refer to FIG. 6 for a schematic diagram of a relative location of a vehicle control apparatus to ground magnetic waveguides. In the schematic diagram, there is a first coil 1001 in the vehicle control apparatus; and second coils 1004, where the second coils 1004 are laid parallel to a road surface and laid along a predetermined travel direction. There are three second coils 1004 shown in the figure, and the quantity is merely an example. At a moment, magnetic field directions of the three second coils 1004 are upward, which are the same as those shown in FIG. 6. A vehicle equipped with the vehicle control apparatus travels along the predetermined travel direction (an arrow direction in the figure). For ease of understanding the technical solutions of this application, the method includes the following steps.

S101: The second coils 1004 laid along the predetermined travel direction transmit a first signal, where the second coils 1004 are laid parallel to the ground and arranged in a row along the predetermined travel direction.

S102: The vehicle equipped with the vehicle control apparatus receives the first signal of the second coils 1004, and the vehicle control apparatus generates a second signal based on the first signal, where the second signal is used to indicate the vehicle to adjust a running track to travel along the predetermined travel direction.

Figure 7:
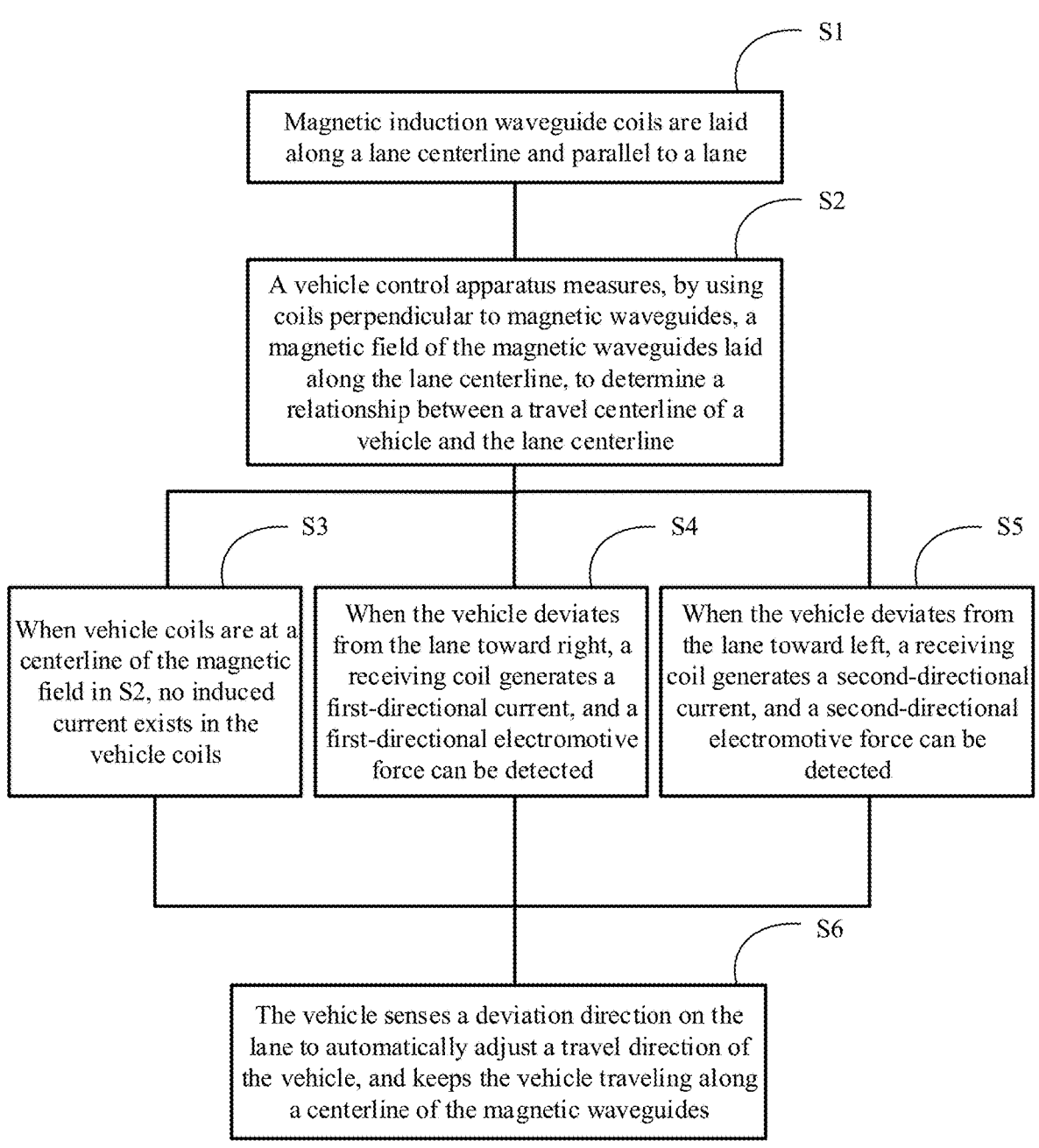
FIG. 7 is a flowchart of a vehicle control method according to an embodiment of this application.

More specifically, FIG. 7 is a flowchart of a vehicle control method according to an embodiment of this application. The method mainly includes the following steps.

S1: Magnetic induction waveguide coils (namely, second coils) are laid along a lane centerline and parallel to a lane.

A centerline of a magnetic field generated by the magnetic induction waveguide coils is perpendicular to the ground. An alternating magnetic field of the magnetic induction waveguide coils is induced by other waveguide coils through waveguides. On a plane on which the magnetic waveguide coils are located, a farther distance from a center of the coils indicates a less change of magnetic flux per unit area.

It should be understood that in this embodiment of this application, a magnetic induction waveguide is used in a lane keeping technology. A signal in the magnetic induction waveguide may be induced by a transmitting coil of a current vehicle to the magnetic induction waveguide, or may be induced by a transmitting coil of another vehicle to the magnetic induction waveguide, or may be energy induced by any device in a magnetic induction communications network to the magnetic waveguide. The alternating magnetic field may be transferred from another waveguide coil through the waveguide, and induced by a waveguide at a distance. Energy of the alternating magnetic field may be lost during propagation through waveguides, and therefore, a repeater or a signal enhancement apparatus may be disposed in a magnetic induction waveguide to reduce an energy loss of the magnetic field. Specific implementation details are not provided in this application.

S2: A vehicle control apparatus measures, by using coils perpendicular to the magnetic waveguides, a magnetic field of magnetic waveguides laid along the lane centerline, to determine a relationship between a travel centerline of the vehicle and the lane centerline. A plane on which receiving coils in the vehicle control apparatus are located is parallel to a travel direction.

Figures 8A, 8B, 8C, 8D:
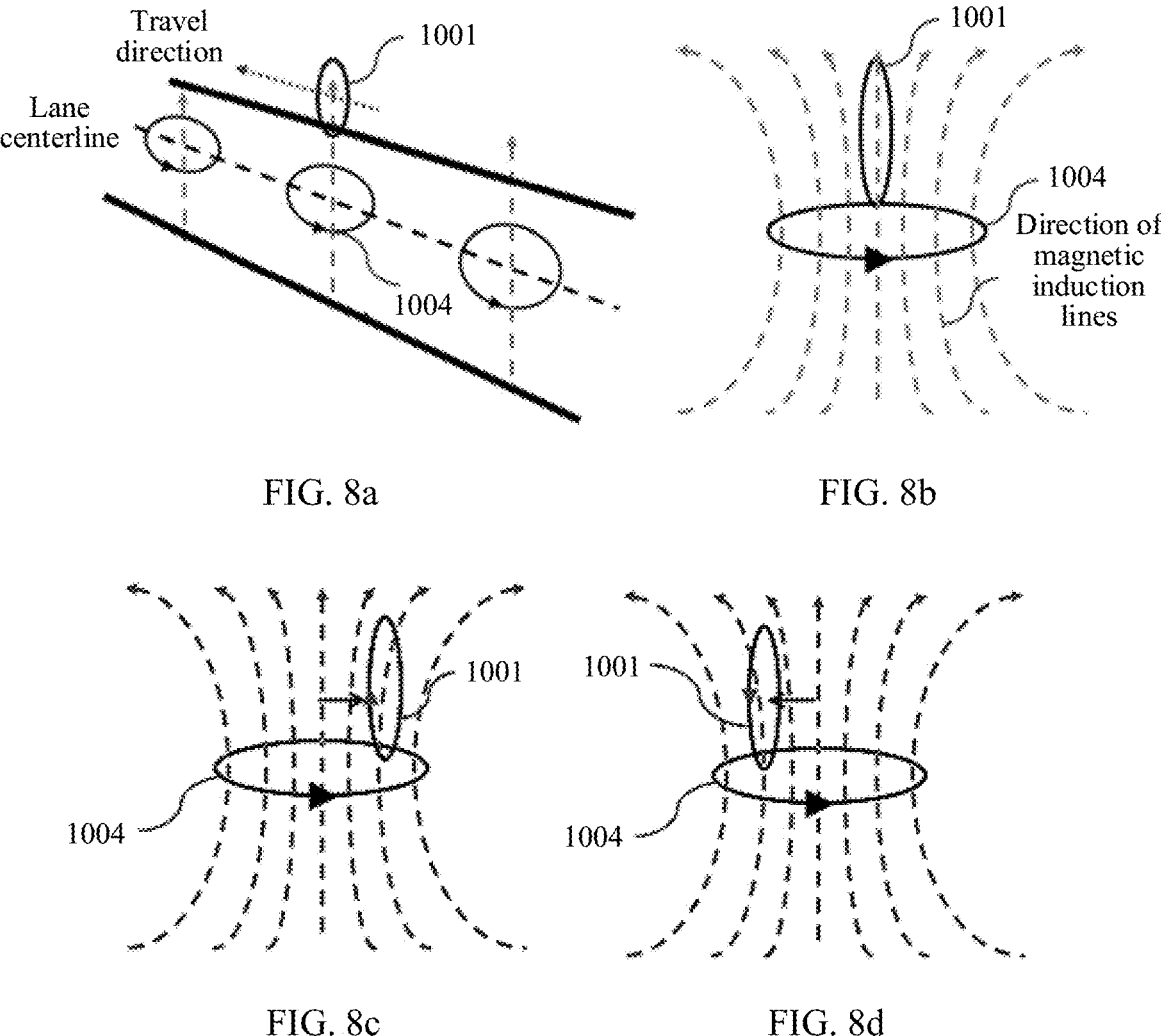
FIG. 8a is a schematic diagram of a relative location relationship between two coils and a travel direction of a vehicle in which receiving coils are located.
FIG. 8b is a schematic diagram of an induced current/electromotive force direction 0 of a receiving coil.
FIG. 8c is a schematic diagram of an induced current/electromotive force direction 1 of a receiving coil.
FIG. 8d is a schematic diagram of an induced current/electromotive force direction 2 of a receiving coil.

Specifically, FIG. 8a is a schematic diagram of a relative location relationship between two coils and the travel direction of the vehicle in which receiving coils are located. In FIG. 8a, there are mainly the first coil 1001 in the vehicle control apparatus, and the second coils 1004 that are horizontally laid on a road surface and laid only along the travel direction of the vehicle. This is different from a current technical implementation in which horizontal coils (equivalent to the first coil in functions) sense magnetic fields of a left navigation coil and a right navigation coil (equivalent to the second coils in functions) to determine a location. In this relative location relationship in this embodiment, only a direction of an induced electromotive force/current needs to be determined in this embodiment. Therefore, hardware implementation complexity is low. Determining does not need to be performed based on a superposed signal of magnetic fields of coils on both sides of a lane, so that power consumption is small and sensitivity is high.

S3: In the lane keeping method, determining is performed based on a characteristic of a spatial structure of magnetic induction lines of the second coils. FIG. 8b is a schematic diagram of an induced current/electromotive force direction θ of a receiving coil. When the first coil 1001 is located at a centerline of the magnetic field of the second coil 1004, no induced current exists in the first coil 1001.

S4: FIG. 8c is a schematic diagram of an induced current/electromotive force direction 1 of a receiving coil. The travel direction of the vehicle is perpendicular to paper inward. When the vehicle deviates from the lane toward right, the first coil 1001 is located on the right side of the magnetic field of the second coil 1004. A change in a magnetic flux in vehicle coils generates a first-directional induced current and a first-directional induced electromotive force in the first coil 1001. The vehicle control apparatus can detect the first-directional electromotive force, and output a control signal.

S5: FIG. 8d is a schematic diagram of an induced current/electromotive force direction 2 of a receiving coil. The travel direction of the vehicle is perpendicular to paper inward. When the vehicle deviates from the lane toward left, the first coil 1001 is located on the left side of the magnetic field of the second coil 1004. A change in a magnetic flux in the vehicle coils generates a second-directional induced current and a second-directional induced electromotive force in the first coil 1001. The vehicle control apparatus can detect the second-directional electromotive force, and output a control signal.

S6: The vehicle equipped with the vehicle control apparatus senses a deviation direction on the lane based on the output control signal to automatically adjust the travel direction of the vehicle, and keeps the vehicle traveling along a centerline of the magnetic waveguides.

FIG. 9 is a flowchart of another vehicle control method according to an embodiment of this application. The method includes the following steps.

S1: Magnetic induction waveguide coils (second coils) are laid along a lane centerline and parallel to a lane. Details are not described herein again.

S2: A vehicle control apparatus measures, by using a first coil perpendicular to the magnetic waveguide coils, a magnetic field of the magnetic induction waveguide coils laid along the lane centerline, to determine a relationship between a travel centerline of a vehicle and the lane centerline, where a plane on which the first coil in the vehicle control apparatus is located is parallel to a travel direction of the vehicle.

The first coil whose coil center points to the travel direction of the vehicle detect a change in the magnetic field, and determine locations of the second coils by detecting magnitude of an induced electromotive force/induced current generated by the first coil.

S3: The vehicle adjusts the travel direction based on the locations of the magnetic induction waveguide coils that are determined by tracking a maximum value of a peak-to-peak value of the induced electromotive force (A lane location is determined based on spatial energy distribution of the magnetic induction waveguide coils).

The following uses a specific example case for description. Assuming that a vehicle speed is v, a spacing between coils in a magnetic waveguide is d, and a change frequency of an excited magnetic field signal in the magnetic waveguide is $f_1$, a frequency of an electrical signal induced by an in-vehicle coil in a traveling process of the vehicle is $$f_2 = \frac{v}{d}f_1.$$

On a normal urban road, if the vehicle speed is 30 km/h, the spacing between the coils in the magnetic waveguide is 1 m, and the excited magnetic field frequency in the magnetic waveguide is 200 Hz, the frequency of the signal induced by the in-vehicle coil is 1.67 kHz.

A signal processing circuit connected to the receiving coil analyzes a peak-to-peak value $V_p$ of an induced electromotive force in a coil per unit time $\Delta t$ after the signal is filtered (for example, noise resulting from external interference can be filtered out through common low-pass or band-pass filtering). The unit time $$\Delta t = \frac{m}{f_2}$$

for analysis is m cycles for receiving an induction signal. m is a positive integer greater than 1, and generally ranges from 2 to 5. Assuming that m is 4, a required analysis time is 2.4 ms. Optionally, in addition to the peak-to-peak value of the electromotive force in the coil, a partial integral of the electromotive force or an entire integral of an absolute value of the electromotive force within the unit time may be used.

FIG. 10a is a schematic diagram of detecting a location of a second coil (a magnetic waveguide coil) by using a single first coil. The magnetic waveguide coil 1004 is laid along a lane centerline to form a magnetic induction waveguide to transfer a first signal. When a vehicle equipped with a vehicle control apparatus 1000 approaches a lane center, a peak-to-peak value $V_p$ of an electromotive force of the first coil gets larger. If the vehicle deviates from the lane center, a maximum amplitude that $V_p$ can reach is necessary less than an amplitude output by a coil at a location not in the lane center. Therefore, a vehicle processor tracks a change of $V_p$ in the first coil within each unit time by tracking a change in a travel direction of the vehicle, and indicates a vehicle control unit (VCU) to change the travel direction. If a value of $V_p$ decreases, the vehicle control unit adjusts the travel direction oppositely. If a value of $V_p$ increases, the vehicle control unit keeps an adjustment direction unchanged. A specific adjustment amplitude may be determined by using an automatic control circuit (for example, the VCU) in a travel control unit according to a classical proportional integral derivative (PID) control method or a machine learning algorithm. For the consideration of engineering implementation, the maximum amplitude value may be a preset value.

FIG. 10b is a schematic diagram of detecting a location of a second coil (a magnetic waveguide coil) by using a first coil array. FIG. 10b shows three magnetic waveguide coils, which are respectively laid at three locations of the vehicle control apparatus 1000: left, middle, and right. First coils on the left and right sides are symmetrically arranged about the first coil in the middle. In an embodiment, the apparatus 1000 is disposed on an axis of the vehicle by using the first coil in the middle as a reference point. The magnetic waveguide coil 1004 is laid along a lane centerline to form a magnetic induction waveguide to transfer a first signal. A lane keeping status may be determined by comparing peak-to-peak values $V_p(i)$ of an electromotive force of all coils in the first coil array. If a coil that outputs a maximum amplitude of $V_p(i)$ is not at a center location (or symmetrical about the center location), a vehicle controller changes a travel direction toward a location of a first coil that outputs the maximum amplitude of $V_p(i)$ until a coil at the center location is the coil that outputs the maximum amplitude. It may be understood that the first coil array may include two, four, or more first coils. This embodiment does not constitute any actual limitation, and only provides a principle of the first coil array. When the first coil array includes even-numbered first coils, the vehicle controller changes the travel direction of the vehicle toward a direction in which amplitudes $V_p(i)$ of the two first coils at the center location increase, until amplitudes of the two first coils at the center location both reach a maximum value (or a specified threshold).

Figure 11:
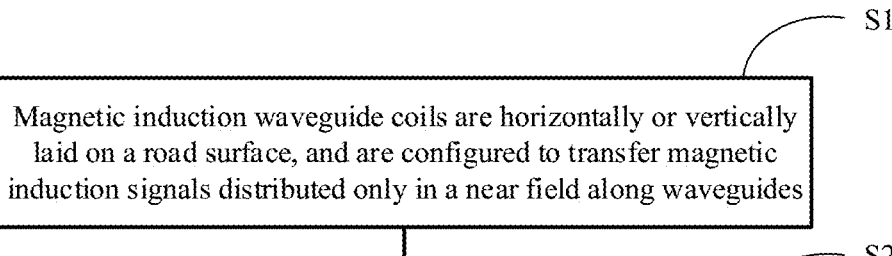
FIG. 11 is a schematic diagram of a vehicle-to-everything communication method according to an embodiment of this application.

FIG. 11 is a schematic diagram of a vehicle-to-everything communication method according to an embodiment of this application. The method includes the following steps.

S1: Magnetic induction waveguide coils (namely, the second coils) are horizontally or vertically laid on a road surface. The magnetic induction waveguide coils transfer magnetic induction signals distributed only in near fields (an alternating magnetic field, a negligible electric field, and a field in which signals are unable to be transmitted to a far field) along waveguides, build a magnetic induction communications network between vehicles or between vehicles and other network elements.

In an existing V2X technology, a wireless communications network is established based on radio frequency far-field signals (the far-field signals are radiated into infinite space through mutual induction between a magnetic field and an electric field). In comparison, spectrum resources may not be occupied by using the solution in this embodiment of this application.

S2: A vehicle V1 modulates to-be-transferred information (for example, a speed, a traffic condition ahead, an emergency brake warning for a front vehicle, and an overtaking warning for a back vehicle) to a changing magnetic field by using a transmitting coil, where the changing magnetic field sequentially induces adjacent and distant waveguide coils to generate an alternating magnetic field including the same information; and a vehicle V2 extracts the information from the vehicle V1 by using a receiving coil.

The transmitting coil of the vehicle V1 and a transmitting coil of the vehicle V2 both may be laid vertically or horizontally; or the transmitting coil of the vehicle V1 may be laid vertically or horizontally, and the transmitting coil of the vehicle V2 may be laid horizontally/vertically. However, if the transmitting coil of the vehicle V1 and the transmitting coil of the vehicle V2 are both laid vertically, more magnetic induction lines can pass through the receiving/transmitting coil and the magnetic waveguide at the same time, thereby achieving a better coupling effect.

Optionally, the signal transferred by the magnetic induction waveguide coils is generated by a network element in the communications network. The network element is coupled to at least one of the magnetic induction waveguide coils, and includes a vehicle equipped with a vehicle control apparatus and a transportation infrastructure device.

Figure 12A:
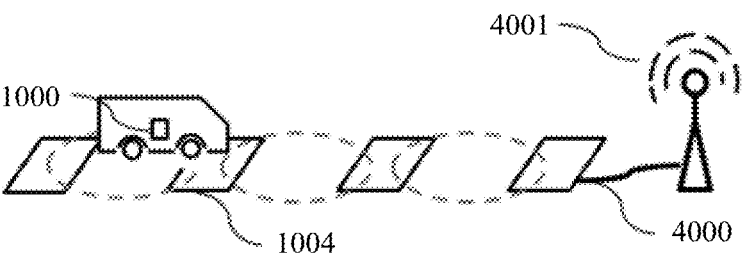
FIG. 12a is a schematic diagram of an example of implementing V2N communication by communicatively connecting magnetic induction waveguide coils to a cellular terminal according to an embodiment of this application.

FIG. 12a is a schematic diagram of an example of implementing V2N communication by communicatively connecting magnetic induction waveguide coils to a cellular terminal according to an embodiment of this application. In FIG. 12a, there are magnetic induction waveguide coils 1004 (second coils) laid on fastened facilities, a vehicle control apparatus 1000 on a mobile vehicle, and a cellular device 4001 connected to the magnetic waveguide coils 1004 through a connection cable or a connection device 4000, to implement V2N communication, where the cellular device 4001 may be a wireless cellular repeater or a wireless cellular base station. Information may be aggregated to a core network and an edge computing station to implement traffic control and vehicle guidance functions and the like. After being connected to the cellular device 4001, the magnetic induction waveguide coils can be integrated into C-V2X.

Figure 12B:
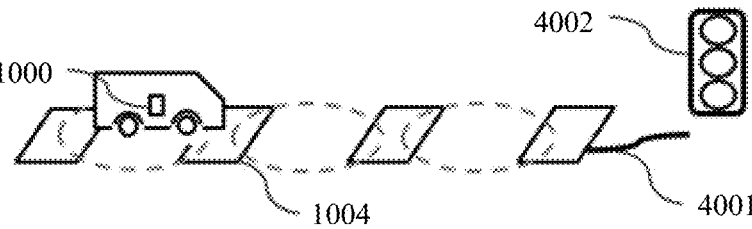
FIG. 12b is a schematic diagram of an example of implementing V2I communication by connecting magnetic induction waveguide coils to a transportation infrastructure device according to an embodiment of this application.

FIG. 12b is a schematic diagram of an example of implementing V2I communication by connecting magnetic induction waveguide coils to a transportation infrastructure device according to an embodiment of this application. In FIG. 12b, there are magnetic induction waveguide coils 1004 (second coils) laid on fastened facilities or a road surface, a vehicle control apparatus 1000 on a mobile vehicle, and an infrastructure device 4002 connected to the magnetic waveguide coils 1004 through a connection cable or a connection device 4000, to implement V2I communication, where the infrastructure device 4002 may be a traffic light. During V2I communication, the vehicle communicates with a nearby traffic facility, and the vehicle obtains nearby traffic information without causing excessive information redundancy.

Figure 12C:
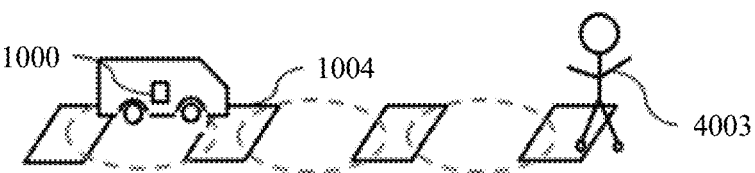
FIG. 12c is a schematic diagram of an example of implementing V2P communication by connecting magnetic induction waveguide coils to a portable device of a pedestrian through wireless magnetic induction communication according to an embodiment of this application.

FIG. 12c is a schematic diagram of an example of implementing V2P communication by connecting magnetic induction waveguide coils to a portable device of a pedestrian through wireless magnetic induction communication according to an embodiment of this application. In FIG. 12c, there are magnetic induction waveguide coils 1004 (second coils) laid on fastened facilities or a road surface, a vehicle control apparatus 1000 on a mobile vehicle, and a pedestrian carrying a magnetic induction communication device 4003, to implement V2P communication. During V2P communication, the pedestrian is warned of oncoming vehicles, and emergency braking control is performed on the vehicle. The magnetic induction communications device 4003 may be integrated into a mobile device such as a mobile phone.

Figure 12D:
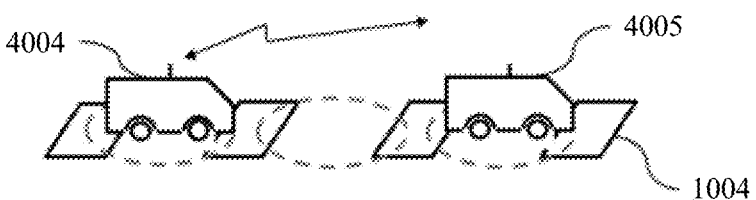
FIG. 12d is a schematic diagram of an example of implementing V2V and V2N communication by connecting magnetic induction waveguide coils to a vehicle or an in-vehicle repeater through wireless magnetic induction communication according to an embodiment of this application.

FIG. 12d is a schematic diagram of an example of implementing V2V and V2N communication by connecting magnetic induction waveguide coils to a vehicle or an in-vehicle repeater through wireless magnetic induction communication according to an embodiment of this application. In FIG. 12d, there are magnetic induction waveguide coils 1004 (second coils) laid on fastened facilities or a road surface, and a vehicle control apparatus 1000 (the apparatuses 1000 are installed on a plurality of vehicles) on a mobile vehicle. A first mobile vehicle 4004 is connected to a core network through a cellular network, and a second mobile vehicle 4005 may be connected to the core network through the first mobile vehicle 4004 after the second mobile vehicle 4005 implements magnetic induction communication with the first mobile vehicle 4004 through the magnetic induction waveguide coils 1004. During V2V and V2N communication, vehicle status and road condition information is transferred, or traffic control and vehicle scheduling information is received.

Figure 13A:
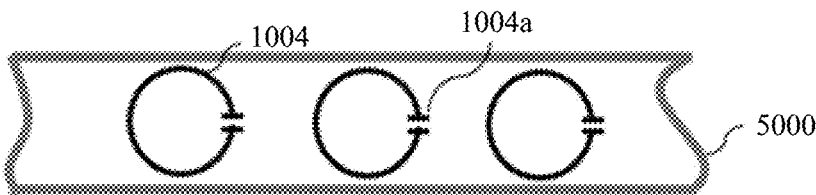
FIG. 13a is a schematic diagram of magnetic induction waveguide coils 1004 (second coils) according to an embodiment of this application.

FIG. 13a is a schematic diagram of magnetic induction waveguide coils 1004 (second coils) according to an embodiment of this application. The magnetic induction waveguide coils 1004 may be manufactured by using flexible PCBs, and are printed on a flexible substrate 5000, so that the magnetic induction waveguide coils 1004 can be easily laid on existing fastened facilities like adhesive tapes. The flexible PCB magnetic induction waveguide coils 1004 are circular-shaped. In an embodiment, geometric parameters of the flexible PCB magnetic induction waveguide coils 1004 are as follows: a diameter is 22 millimeters (mm)

and a line width is 1 mm. The coils are connected to a capacitor 1004a. In an embodiment, a capacity of the capacitor is 270 picofarads. In this case, a resonance frequency of the coils is 46 MHz, and an available communication bandwidth is 5 MHz.

Figure 13B:
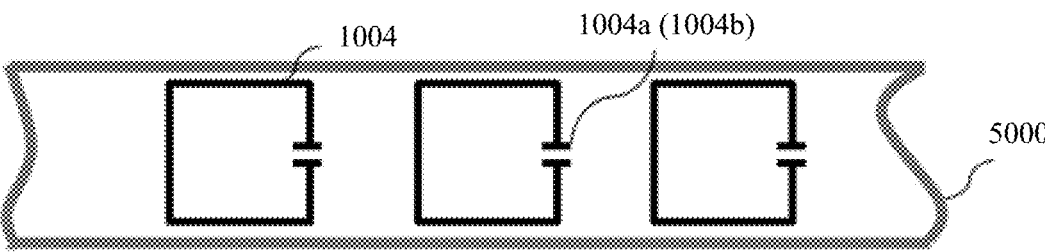
FIG. 13b is another schematic diagram of magnetic induction waveguide coils 1004 (second coils) according to an embodiment of this application.

FIG. 13b is another schematic diagram of magnetic induction waveguide coils 1004 (second coils) according to an embodiment of this application. The magnetic induction waveguide coils 1004 may also be manufactured by using flexible PCBs, and are printed on a flexible substrate 5000. The flexible PCB magnetic induction waveguide coils are rectangular-shaped. In an embodiment, geometric parameters of the flexible PCB magnetic induction waveguide coils are as follows: a length of an outer edge of the rectangle is 9.5 mm, a line width is 1.5 mm, and a width of an opening is 0.8 mm. The coils 1004 are connected to a capacitor 1004a. In an embodiment, a capacity of the capacitor is 22 picofarads, and a 50-ohm capacitor 1004b is connected in parallel. In this case, a resonance frequency of the coils is 240 MHz, and an available communication bandwidth is 45 MHz to 70 MHz.

The capacitor connected to the coils in the printed circuit may be a variable capacitor, and the resonance frequency of the waveguide coils is adjusted by using a peripheral adaptive coupled control circuit, to implement optimal coupling with a magnetic-inductive transmit end and the magnetic-inductive receive end in S2.

Figure 13C:
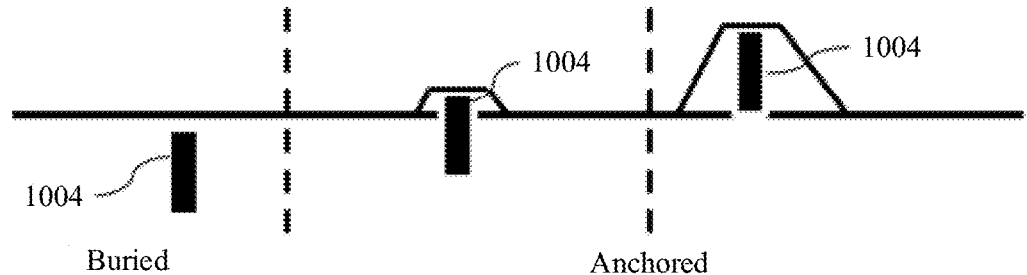
FIG. 13c is another schematic diagram of magnetic induction waveguide coils 1004 (second coils) according to an embodiment of this application.

FIG. 13c is another schematic diagram of magnetic induction waveguide coils 1004 (second coils) according to an embodiment of this application. The magnetic induction waveguide coils 1004 may alternatively be placed coaxially, as shown in FIG. 13c. Projections of the magnetic induction waveguide coils 1004 coincide along a road direction. The magnetic induction waveguide coils 1004 are manufactured by using hard PCBs, and buried underground or anchored to a road surface.

A bus in the embodiments of this application may be an industry standard architecture (ISA) bus, a peripheral component interconnect (PCI) bus, an extended industry standard architecture (EISA) bus, or the like. The bus may be classified as an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware and a software function unit.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A vehicle control apparatus, comprising:
   one or more first coils;
   a processor; and
   a communications interface, wherein the one or more first coils are coupled to the processor, and the processor is coupled to the communications interface;
   wherein the one or more first coils are configured to receive a first signal of second coils laid along a predetermined travel direction, and there is a preset relative location relationship between the one or more first coils and the second coils,
   wherein when a vehicle equipped with the vehicle control apparatus deviates from the predetermined travel direction, the one or more first coils generate an electromotive force signal based on a change in the relative location relationship between the one or more first coils and the second coils,
   wherein the processor is configured to output a second signal based on the electromotive force signal, and the second signal is used to indicate the vehicle to adjust a running track to travel along the predetermined travel direction,
   wherein the processor is further configured to receive a third signal from the communications interface, the communications interface is configured to receive a signal from the vehicle equipped with the vehicle control apparatus, the processor generates an electromotive force signal based on the third signal, the one or more first coils are configured to send a fourth signal based on the electromotive force signal, and the fourth signal is used to identify the vehicle equipped with the vehicle control apparatus and indicate running information of the vehicle, wherein the one or more first coils generate the electromotive force signal when the vehicle deviates from the predetermined travel direction to a first direction, the electromotive force signal comprises a first-directional electromotive force, the processor outputs the second signal based on the first-directional electromotive force, and the second signal is used to indicate to the vehicle to adjust the running track toward a second direction to travel along the predetermined travel direction, and wherein the one or more first coils generate the electromotive force signal when the vehicle deviates from the predetermined travel direction to the second direction, the electromotive force signal comprises a second-directional electromotive force, the processor outputs the second signal based on the second-directional electromotive force, and the second signal is used to indicate the vehicle to adjust the running track to the first direction to travel along the predetermined travel direction, wherein the first direction is opposite to the second direction.

2. A vehicle with a lane keeping function and a communications function, comprising:

a vehicle control apparatus;

a steering system; and a drivetrain, wherein the vehicle control apparatus is coupled to both the steering system and the drivetrain, the vehicle control apparatus comprises one or more first coils, a processor, and a communications interface, the one or more first coils are coupled to the processor, and the processor is coupled to the communications interface;

wherein the one or more first coils are configured to receive a first signal of second coils laid along a predetermined travel direction, and there is a preset relative location relationship between the one or more first coils and the second coils, wherein when a vehicle equipped with the vehicle control apparatus deviates from the predetermined travel direction, the one or more first coils generate an electromotive force signal based on a change in the relative location relationship between the one or more first coils and the second coils, wherein the processor outputs a second signal based on the electromotive force signal, and the second signal is used to indicate the steering system and the drivetrain to adjust a running track to travel along the predetermined travel direction, wherein the processor is further configured to receive a third signal from the communications interface, the communications interface is configured to receive a signal from the vehicle equipped with the vehicle control apparatus, the processor generates an electromotive force signal based on the third signal, the one or more first coils are configured to send a fourth signal based on the electromotive force signal, and the fourth signal is used to identify the vehicle equipped with the vehicle control apparatus and indicate running information of the vehicle, wherein the one or more first coils generate the electromotive force signal when the vehicle deviates from the predetermined travel direction to a first direction, the electromotive force signal comprises a first-directional electromotive force, the processor outputs the second signal based on the first-directional electromotive force, and the second signal is used to indicate to the vehicle to adjust the running track toward a second direction to travel along the predetermined travel direction, and wherein the one or more first coils generate the electromotive force signal when the vehicle deviates from the predetermined travel direction to the second direction, the electromotive force signal comprises a second-directional electromotive force, the processor outputs the second signal based on the second-directional electromotive force, and the second signal is used to indicate the vehicle to adjust the running track to the first direction to travel along the predetermined travel direction, wherein the first direction is opposite to the second direction.

3. The apparatus according to claim 1, wherein when the vehicle control apparatus is configured to receive the first signal of the second coils laid along the predetermined travel direction, the one or more first coils are perpendicular to the second coils, and the second coils are laid parallel to the ground and arranged in a row along the predetermined travel direction.

4. The apparatus according to claim 1, wherein the electromotive force signal comprises electromotive force amplitude information within a predetermined time interval, the processor outputs the second signal based on the electromotive force amplitude information, the second signal is used to indicate the vehicle to adjust the running track to travel along the predetermined travel direction, and the electromotive force amplitude information comprises one or more of the following information: a peak-to-peak value of an electromotive force, an absolute value of a maximum value or an absolute value of a minimum value of an electromotive force, and an integral of an electromotive force within an entire or a partial of the predetermined time interval.

5. The apparatus according to claim 4, wherein:

when filtered electromotive force amplitude information within the predetermined time interval is less than filtered electromotive force amplitude information within a next predetermined time interval, an adjustment direction indicated by the second signal corresponding to the next predetermined time interval is opposite to an adjustment direction indicated by the second signal corresponding to the predetermined time interval; and when the filtered electromotive force amplitude information within the predetermined time interval is greater than the filtered electromotive force amplitude information within the next predetermined time interval, the adjustment direction indicated by the second signal corresponding to the next predetermined time interval is the same as the adjustment direction indicated by the second signal corresponding to the predetermined time interval.

6. The apparatus according to claim 4, wherein:

at least two of the first coils are symmetrically disposed on left and right sides of the vehicle; when electromotive force amplitude information generated by a first coil on one side is greater than electromotive force amplitude information generated by the other first coil on the other side, the second signal indicates the vehicle to adjust the running track toward a first direction to travel along the predetermined travel direction; and when the electromotive force amplitude information generated by the first coil on the one side is less than the electromotive force amplitude information generated by the first coil on the other side, the second signal indicates the vehicle to adjust the running track toward a second direction to travel along the predetermined travel direction, wherein the first direction is opposite to the second direction.

7. The vehicle according to claim 2, wherein when the vehicle control apparatus is configured to receive the first signal of the second coils laid along the predetermined travel direction, the one or more first coils are perpendicular to the second coils, and the second coils are laid parallel to the ground and arranged in a row along the predetermined travel direction.

8. The vehicle according to claim 2, wherein the electromotive force signal comprises electromotive force amplitude information within a predetermined time interval, the processor outputs the second signal based on the electromotive force amplitude information, the second signal is used to indicate the vehicle to adjust the running track to travel along the predetermined travel direction, and the electromotive force amplitude information comprises one or more of the following information: a peak-to-peak value of an electromotive force, an absolute value of a maximum value or an absolute value of a minimum value of an electromotive force, and an integral of an electromotive force within an entire or a partial of the predetermined time interval.

9. The apparatus according to claim 8, wherein:

when filtered electromotive force amplitude information within the predetermined time interval is less than filtered electromotive force amplitude information within a next predetermined time interval, an adjustment direction indicated by the second signal corresponding to the next predetermined time interval is opposite to an adjustment direction indicated by the second signal corresponding to the predetermined time interval; and when the filtered electromotive force amplitude information within the predetermined time interval is greater than the filtered electromotive force amplitude information within the next predetermined time interval, the adjustment direction indicated by the second signal corresponding to the next predetermined time interval is the same as the adjustment direction indicated by the second signal corresponding to the predetermined time interval.

10. The vehicle according to claim 8, wherein:

at least two of the first coils are symmetrically disposed on left and right sides of the vehicle; when electromotive force amplitude information generated by a first coil on one side is greater than electromotive force amplitude information generated by the other first coil on the other side, the second signal indicates the vehicle to adjust the running track toward a first direction to travel along the predetermined travel direction; and when the electromotive force amplitude information generated by the first coil on the one side is less than the electromotive force amplitude information generated by the first coil on the other side, the second signal indicates the vehicle to adjust the running track toward a second direction to travel along the predetermined travel direction, wherein the first direction is opposite to the second direction.

* * * * *